US011259016B2

(12) United States Patent
Li et al.

(10) Patent No.: US 11,259,016 B2
(45) Date of Patent: Feb. 22, 2022

(54) METHOD AND APPARATUS FOR VIDEO CODING

(71) Applicant: TENCENT AMERICA LLC, Palo Alto, CA (US)

(72) Inventors: Guichun Li, Milpitas, CA (US); Liang Zhao, Sunnyvale, CA (US); Xin Zhao, Santa Clara, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/910,808

(22) Filed: Jun. 24, 2020

(65) Prior Publication Data

US 2020/0413047 A1   Dec. 31, 2020

Related U.S. Application Data

(60) Provisional application No. 62/869,006, filed on Jun. 30, 2019.

(51) Int. Cl.
*H04N 19/107* (2014.01)
*H04N 19/176* (2014.01)

(52) U.S. Cl.
CPC ......... *H04N 19/107* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 2008/0225946 A1* | 9/2008 | Yin | H04N 19/51 |
| | | | 375/240.12 |
| 2018/0176582 A1* | 6/2018 | Zhao | H04N 19/124 |

(Continued)

OTHER PUBLICATIONS

ITU-T Telecommunication Standardization Section of ITU, "High efficiency video coding", H.265, Series H: Audiovisual and Multimedia Systems Infrastructure of audiovisual series—Coding of moving video, International Telecommunication Union, Dec. 2016 (664 pages).

(Continued)

*Primary Examiner* — Frederick D Bailey
(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus for video decoding includes processing circuitry. The processing circuitry decodes prediction information of a current block in a current picture from a coded video bitstream. The prediction information is indicative of a prediction mode that combines an intra prediction and an inter prediction. The intra prediction is based on at least a first reference sample in the current picture, and the inter prediction is based on at least a second reference sample in a reference picture of the current picture. Further, the processing circuitry determines coding tools associated with the prediction mode that combines the intra prediction and the inter prediction and reconstruct at least a sample of the current block according to the determined coding tools associated with the prediction mode.

18 Claims, 20 Drawing Sheets

(56) References Cited

U.S. PATENT DOCUMENTS

| | | | |
|---|---|---|---|
| 2018/0295385 A1* | 10/2018 | Alshin | H04N 19/176 |
| 2019/0045218 A1* | 2/2019 | Ikai | H04N 19/52 |
| 2019/0208203 A1* | 7/2019 | Tsukuba | H04N 19/147 |
| 2020/0228796 A1* | 7/2020 | Seregin | H04N 19/70 |
| 2020/0260070 A1* | 8/2020 | Yoo | H04N 19/157 |
| 2020/0396445 A1* | 12/2020 | Seregin | H04N 19/105 |
| 2020/0413071 A1* | 12/2020 | Huang | H04N 19/593 |
| 2020/0413089 A1* | 12/2020 | Liao | H04N 19/577 |
| 2021/0014522 A1* | 1/2021 | Jung | H04N 19/176 |
| 2021/0029357 A1* | 1/2021 | Koo | H04N 19/625 |
| 2021/0051345 A1* | 2/2021 | Tsai | H04N 19/46 |

OTHER PUBLICATIONS

Benjamin Brass et al.,"Versatile Video Coding (Draft 4)", Joint Video Experts Team (JVET) of ITU-T SG 16 WP 3 and ISO/IEC JTC 1/SC 29/WG11, JVET-M1001-v7, 13th Meeting: Marrakech, MA, Jan. 9-18, 2019 (299 pages).

Man-Shu Chiang et al., "CE10.1.1: Multi-hypothesis prediction for improving AMVP mode, skip or merge mode, and intra mode", Joint Video Experts Team (JVET) of ITU-T SG 16 WP 3 and ISO/IEC JTC 1/SC 29/WG 11, JVET-L0100-V3, 12th Meeting: Macao, CN, Oct. 3-12, 2018 (14 pages).

* cited by examiner

| Intra mode | 0  | 1  | 2  | 3  | 4  | 5  | 6  | 7  | 8  | 9  | 10 | 11 | 12 | 13 | 14 | 15 | 16 |
|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 |
| Intra mode | 17 | 18 | 19 | 20 | 21 | 22 | 23 | 24 | 25 | 26 | 27 | 28 | 29 | 30 | 31 | 32 | 33 |
| set | 17 | 18 | 19 | 20 | 21 | 22 | 23 | 24 | 25 | 26 | 27 | 28 | 29 | 30 | 31 | 32 | 33 |
| Intra mode | 34 | 35 | 36 | 37 | 38 | 39 | 40 | 41 | 42 | 43 | 44 | 45 | 46 | 47 | 48 | 49 | 50 |
| set | 34 | 33 | 32 | 31 | 30 | 29 | 28 | 27 | 26 | 25 | 24 | 23 | 22 | 21 | 20 | 19 | 18 |
| Intra mode | 51 | 52 | 53 | 54 | 55 | 56 | 57 | 58 | 59 | 60 | 61 | 62 | 63 | 64 | 65 | 66 | 67(LM) |
| set | 17 | 16 | 15 | 14 | 13 | 12 | 11 | 10 | 9 | 8 | 7 | 6 | 5 | 4 | 3 | 2 | NULL |

*FIG. 13*

$$T_{R \times N} = \begin{bmatrix} t_{11} & t_{12} & t_{13} & \cdots & t_{1N} \\ t_{21} & t_{22} & t_{23} & \cdots & t_{2N} \\ \vdots & & & \ddots & \vdots \\ t_{R1} & t_{R2} & t_{R3} & \cdots & t_{RN} \end{bmatrix}$$

FIG. 16

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

FIG. 18

METHOD AND APPARATUS FOR VIDEO CODING

INCORPORATION BY REFERENCE

This present disclosure claims the benefit of priority to U.S. Provisional Application No. 62/869,006, "METHOD ON CIIP AND INTER PDPC" filed on Jun. 30, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

SUMMARY

Aspects of the disclosure provide methods and apparatuses for video encoding/decoding. In some examples, an apparatus for video decoding includes receiving circuitry and processing circuitry. The processing circuitry decodes prediction information of a current block in a current picture from a coded video bitstream. The prediction information is indicative of a prediction mode that combines an intra prediction and an inter prediction. The intra prediction is based on at least a first reference sample in the current picture, and the inter prediction is based on at least a second reference sample in a reference picture of the current picture. Further, the processing circuitry determines coding tools associated with the prediction mode that combines the intra prediction and the inter prediction and reconstruct at least a sample of the current block according to the determined coding tools associated with the prediction mode.

In some examples, the prediction mode is one of a combined intra/inter prediction (CIIP) mode, and an inter position dependent prediction combination (PDPC) mode.

In an embodiment, the processing circuitry disables a weighed bi-prediction with unequal weighting for use in the inter prediction.

In another embodiment, the processing circuitry disables a weighted prediction for use in the inter prediction.

In another embodiment, the processing circuitry disables a local illumination compensation for use in the inter prediction.

In another embodiment, the processing circuitry performs a secondary transform between a de-quantization and a primary transform. In an example, the processing circuitry determines a transform set associated with one of a Planar intra prediction mode and a DC intra prediction mode. Then, the processing circuitry selects, from the transform set, a transform kernel associated with one of the planar intra prediction mode and the DC intra prediction mode for use in the secondary transform.

In another embodiment, the processing circuitry can perform a weighed bi-prediction with equal weighting in the inter prediction.

In another embodiment, the prediction mode is an inter position dependent prediction combination (PDPC) mode, and the processing circuitry disables decoder side motion vector refinement (DMVR) for use in the inter prediction.

In some embodiments, a same context model is used for a CIIP mode flag and an inter PDPC mode flag. The processing circuitry updates a same context in response to a decoded CIIP mode flag, or a decoded inter PDPC mode flag.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 13 shows an exemplary mapping from an intra prediction mode to a respective transform set.

FIG. 16 shows a reduced secondary transform matrix that is an R×N matrix.

FIG. 18 shows a table that is used for transform set selection in an example.

DETAILED DESCRIPTION OF EMBODIMENTS

Figure 1:
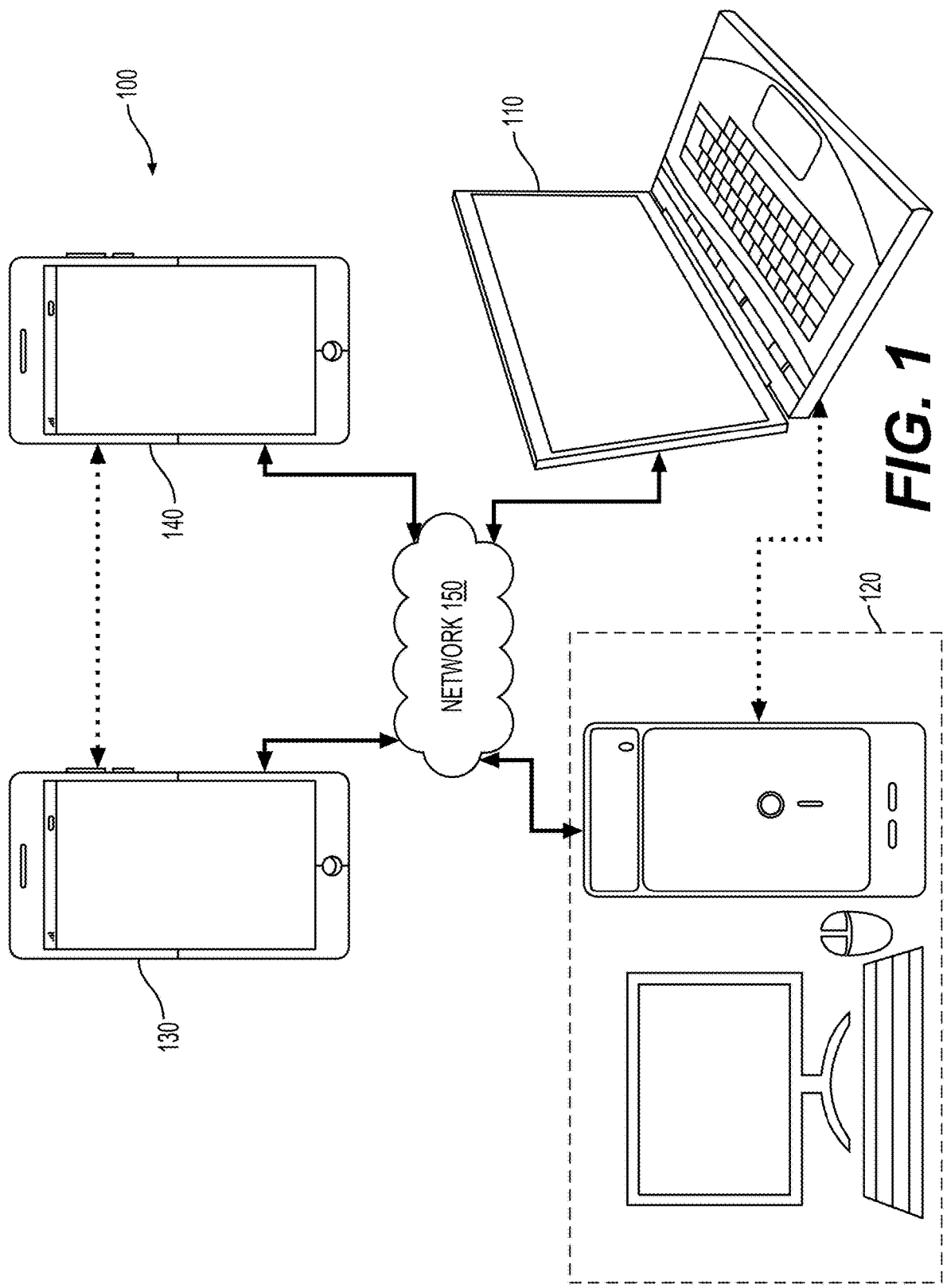
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140)

that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
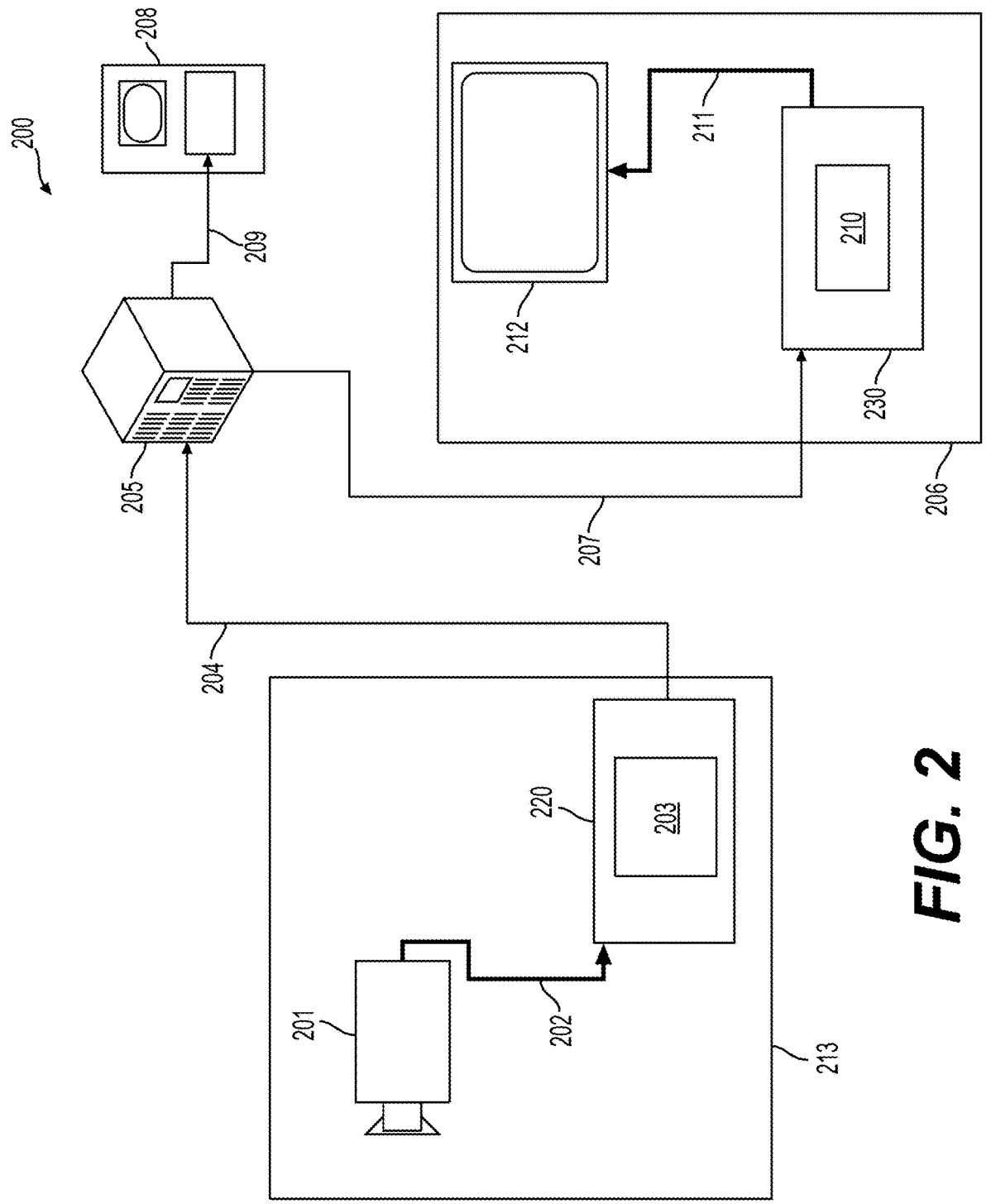
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
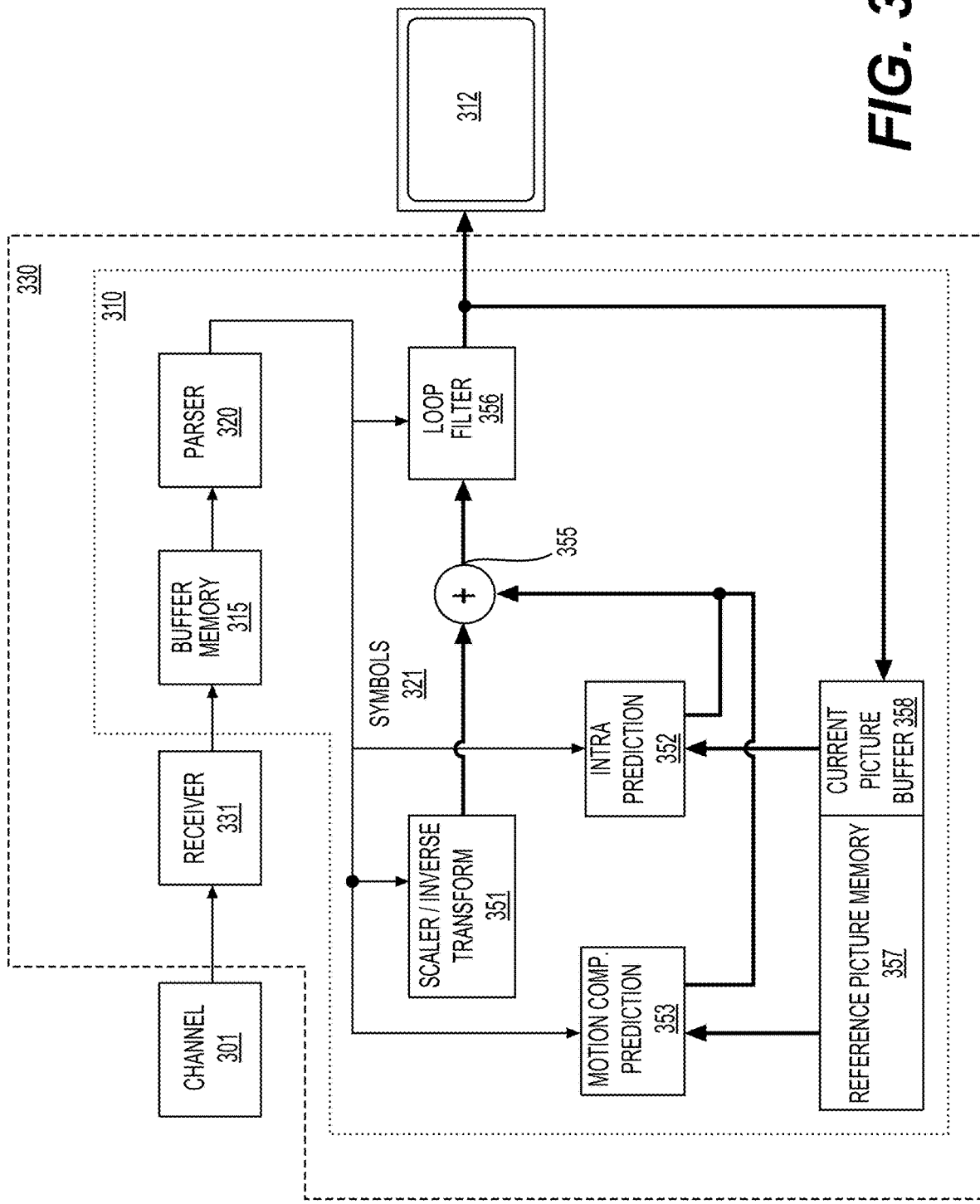
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
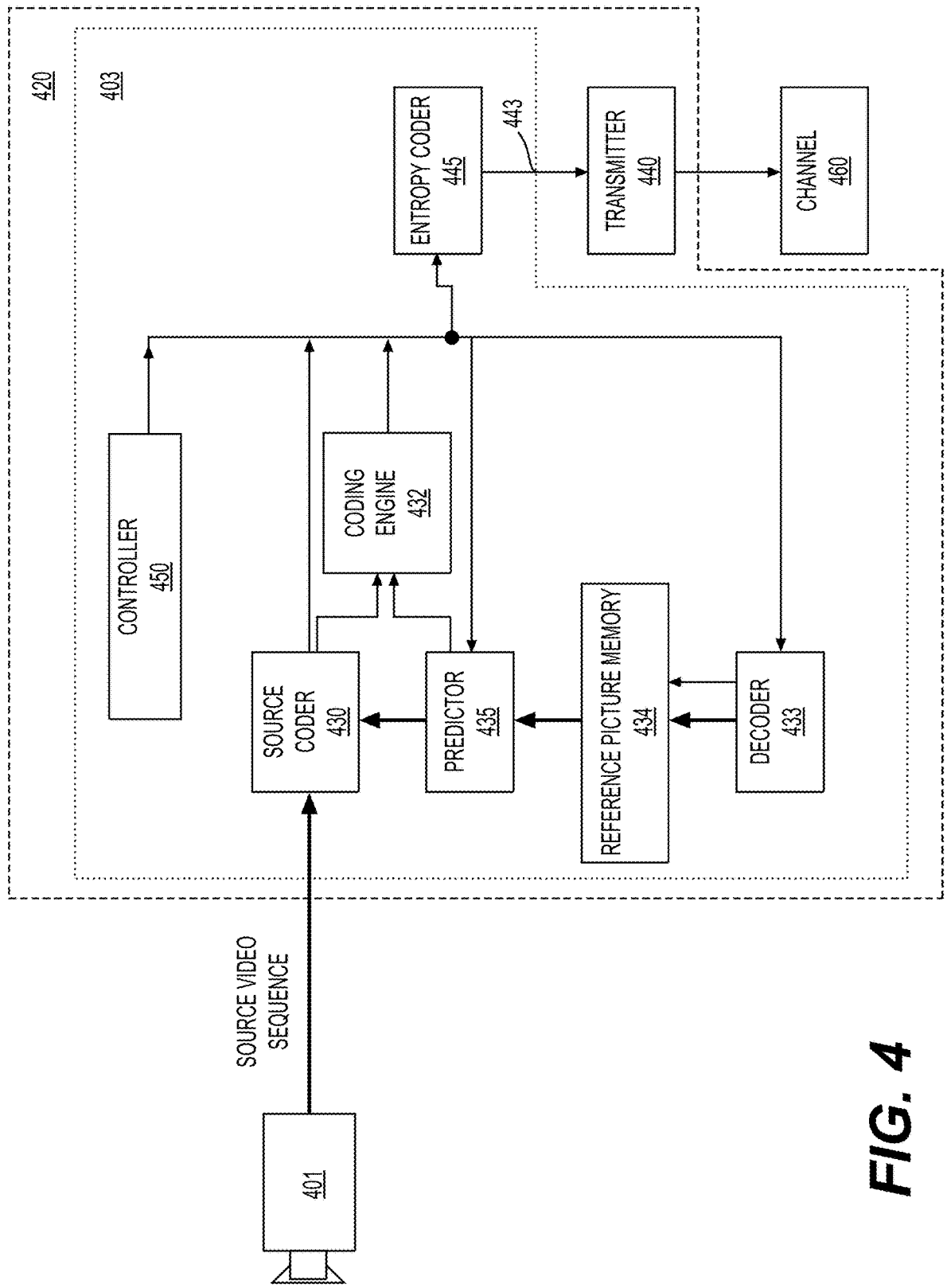
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously coded picture from the video sequence that were designated as "reference pictures." In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
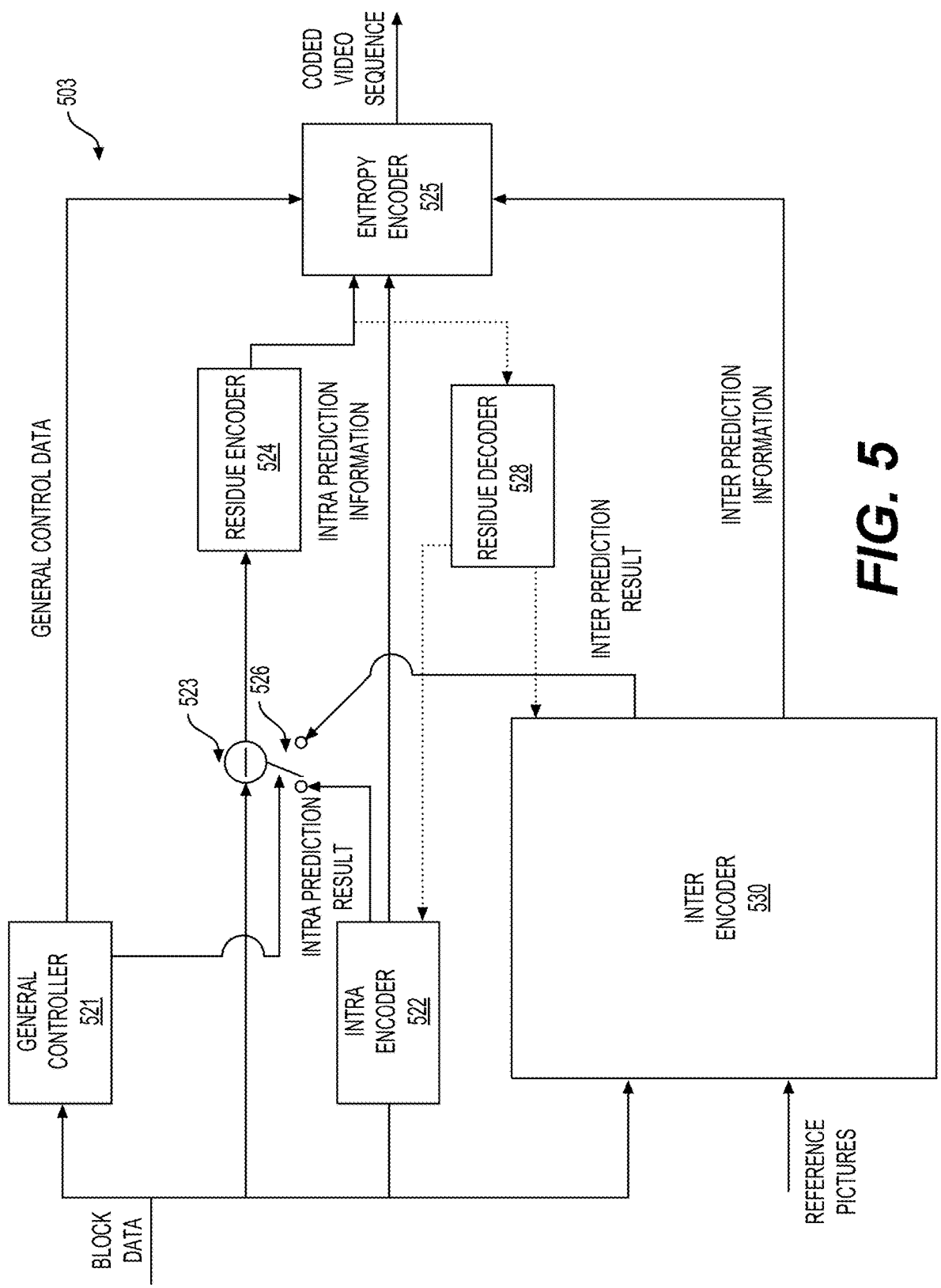
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
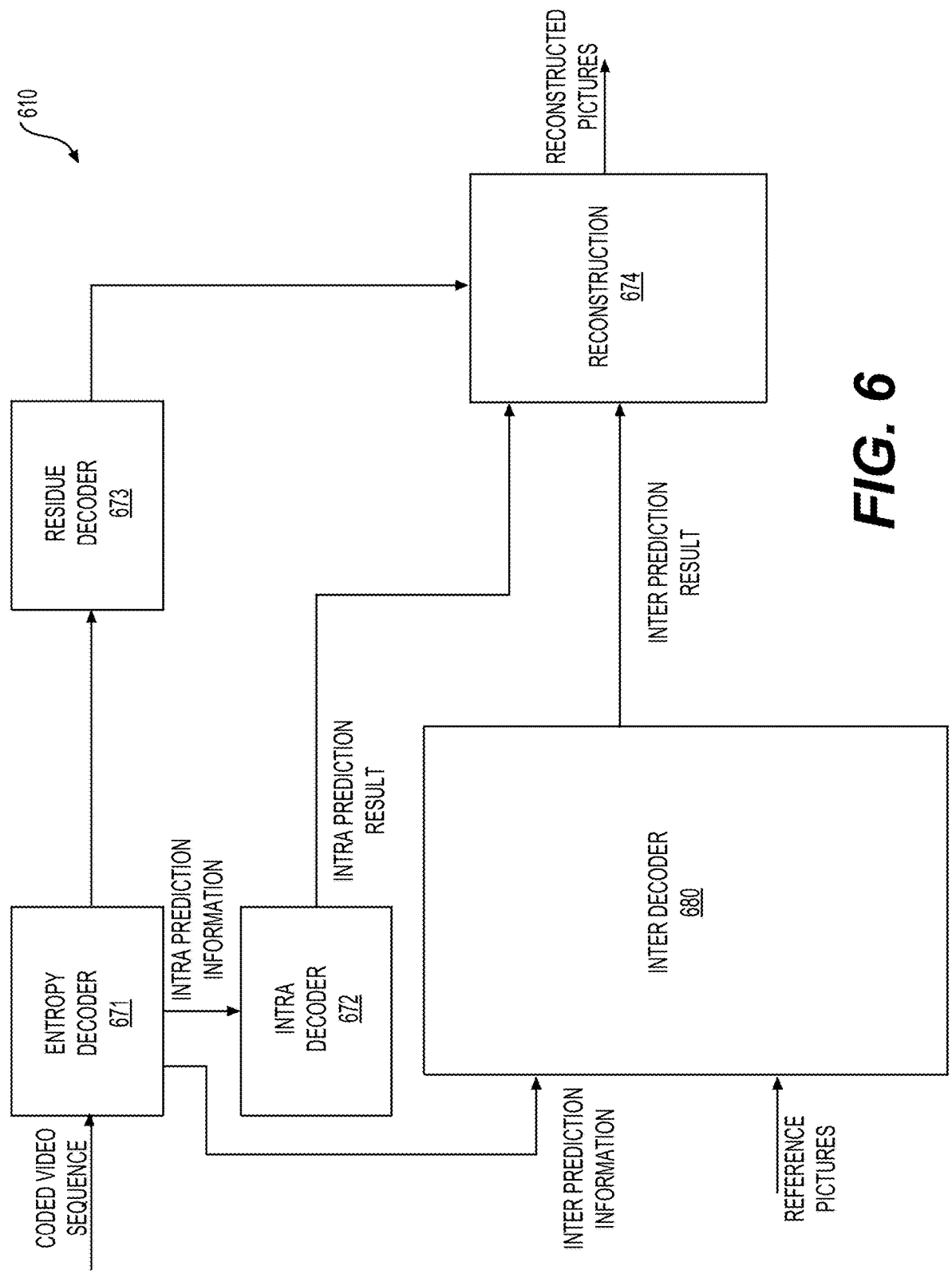
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide techniques to be used with combined intra inter prediction (CIIP) and inter position dependent prediction combination (Inter PDPC).

Inter prediction and intra prediction can be used separately or can be combined.

In various embodiments, for an inter-predicted CU, motion parameters including motion vectors, reference picture indices, reference picture list usage index, and/or other additional information can be used for inter-predicted sample generation. Inter prediction can include uni-prediction, bi-prediction, and/or the like. In uni-prediction, a reference picture list (e.g., a first reference picture list or a list 0 (L0) or a second reference picture list or a list 1 (L1)) can be used. In bi-prediction, both L0 and L1 can be used. The reference picture list usage index can indicate that the reference picture list(s) includes L0, L1, or L0 and L1.

The motion parameters can be signaled in an explicit or implicit manner. When a CU is coded with a skip mode, the CU can be associated with one PU and can include no significant residual coefficients (e.g., the residual coefficients are zero), no coded motion vector difference (MVD), or no reference picture index.

A merge mode can be used in which motion parameters for a current CU can be obtained from neighboring CUs, including spatial and temporal merge candidates, and optionally other merge candidates. The merge mode can be applied to an inter-predicted CU, and may be used for a skip mode. Alternatively, motion parameters can be explicit transmitted or signaled. For example, motion vectors, a corresponding reference picture index for each reference picture list, a reference picture list usage flag, and other information can be signaled explicitly per each CU.

In some embodiments, one or more of the following inter prediction coding tools are used: (1) extended merge prediction, (2) merge mode with motion vector difference (MMVD), (3) advanced motion vector prediction (AMVP) mode with symmetric MVD signaling, (4) affine motion compensated prediction, (5) subblock-based temporal motion vector prediction (SbTMVP), (6) adaptive motion vector resolution (AMVR), (7) motion field storage: 1/16th luma sample MV storage and 8×8 motion field compression, (8) bi-prediction with weighted averaging (BWA), (9) bi-directional optical flow (BDOF), (10) decoder side motion vector refinement (DMVR), (11) triangle partition prediction, and (12) combined inter and intra prediction (CIIP).

Figure 7:
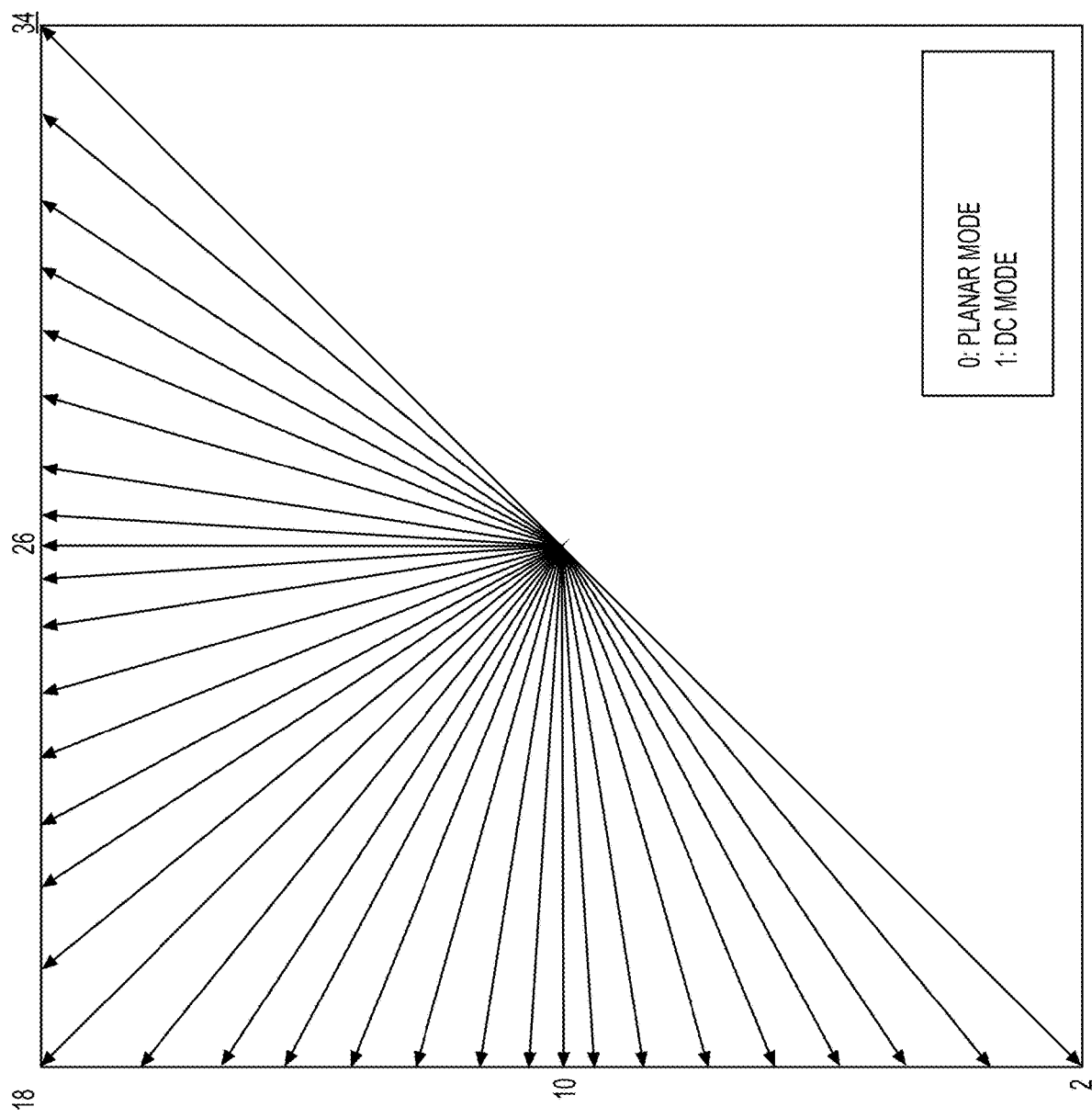
FIG. 7 shows an illustration of exemplary intra prediction directions and the intra prediction modes used in HEVC.

FIG. 7 shows an illustration of exemplary intra prediction directions and the intra prediction modes used in HEVC. In HEVC, there are total 35 intra prediction modes (mode 0 to mode 34). The mode 0 and mode 1 are non-directional modes, among which mode 0 is planar mode and mode 1 is DC mode. The modes 2-34 are directional modes, among which mode 10 is horizontal mode, mode 26 is vertical mode, and mode 2, mode 18 and mode 34 are diagonal modes. In some examples, the intra prediction modes are signaled by three most probable modes (MPMs) and 32 remaining modes.

Figure 8:
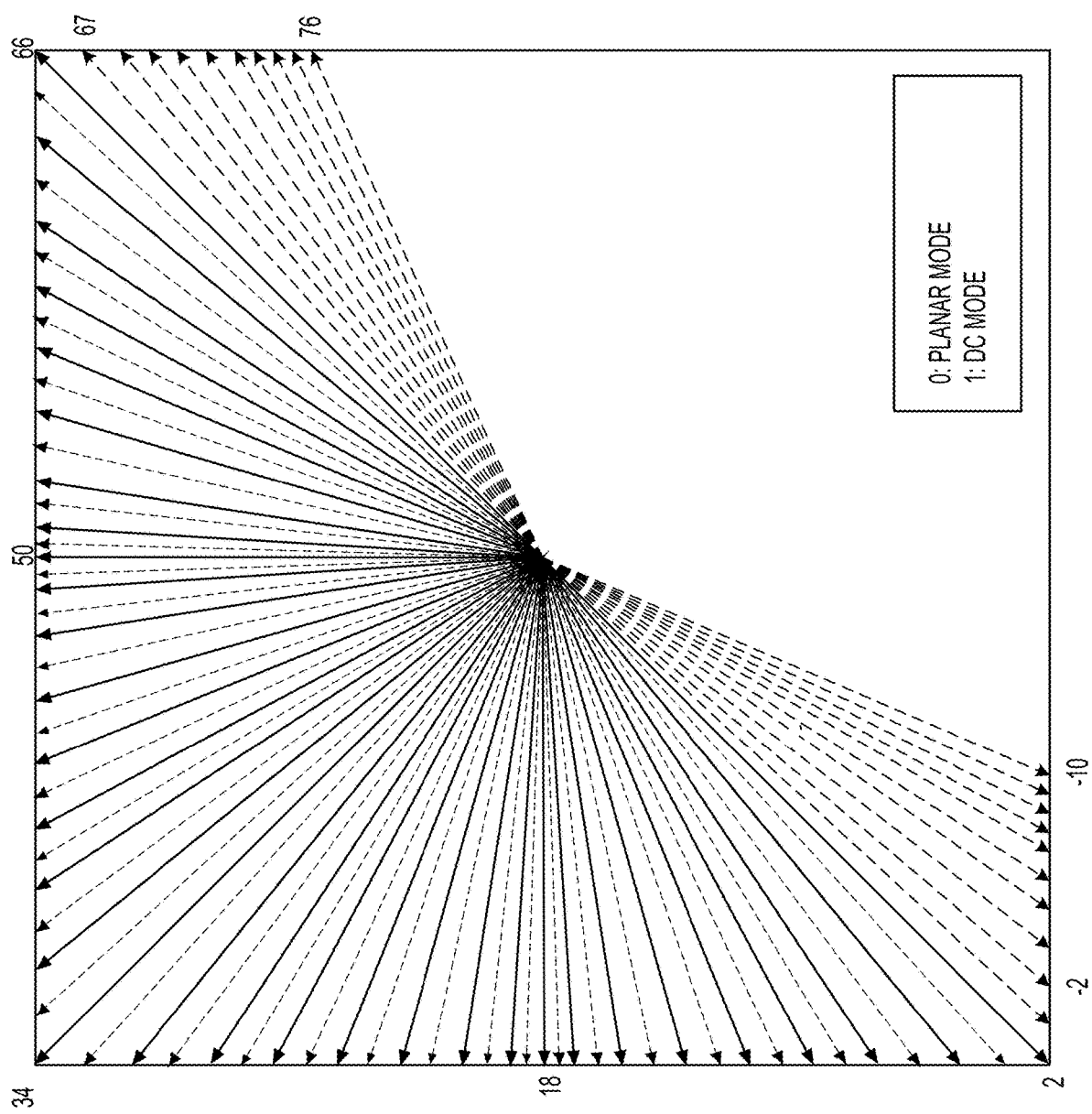
FIG. 8 shows an illustration of exemplary intra prediction directions and intra prediction modes in some examples (e.g., VVC).

FIG. 8 shows an illustration of exemplary intra prediction directions and intra prediction modes in some examples (e.g., VVC). There are total 87 intra prediction modes (mode −10 to mode 76), among which mode 18 is horizontal mode, mode 50 is vertical mode, and mode 2, mode 34 and mode 66 are diagonal modes. Modes −1~−10 and Modes 67~76 are called wide-angle intra prediction (WAIP) modes.

According to an aspect of the disclosure, position dependent prediction combination (PDPC) uses filtering techniques on boundary reference samples and combines filtered reference samples with prediction. The prediction can be intra prediction or inter prediction. In the present disclosure, PDPC refers to combine filtered reference samples with intra prediction and inter PDPC refers to combine filtered reference samples with inter prediction.

In some embodiments, PDPC is applied to the following intra modes without signaling: planar, DC, WAIP modes, horizontal, vertical, bottom-left angular mode (e.g., mode 2 in VVC) and its 8 adjacent angular modes (e.g., mode 3-10 in VVC), and top-right angular mode (e.g., mode 66 in VVC) and its 8 adjacent angular modes (e.g., mode 58-65 in VVC).

In an example, the prediction sample pred'[x][y] located at position (x, y) is predicted using an intra prediction mode (DC, planar, angular) and a linear combination of reference samples according to (Eq. 1):

$$\text{pred}'[x][y]=(wL \times R(-1,y)+wT \times R(x,-1)-wTL \times R(-1,-1)+(64-wL-wT+wTL) \times \text{pred}[x][y]+32)>>6 \quad \text{(Eq. 1)}$$

where pred[x][y] is the intra prediction value, R(x,−1), R(−1,y) represent the (unfiltered) reference samples located at top and left of current sample (x, y), respectively, R(−1,−1) represents the reference sample located at the top-left corner of the current block, and wT, wL, and wTL denote weights. For the DC mode, the weights are calculated by (Eq. 2-Eq. 5), width denotes the width of the current block, and height denotes the height of the current block:

$$wT=32>>((y<<1)>>n\text{Scale}) \quad \text{(Eq. 2)}$$

$$wL=32>>((x<<1)>>n\text{Scale}) \quad \text{(Eq. 3)}$$

$$wTL = +(wL>>4)+(wT>>4) \quad (Eq. 4)$$

$$nScale=(\log 2(width)+\log 2(height)-2)>>2 \quad (Eq. 5)$$

where wT denotes the weighting factor for the reference sample located in the above reference line with the same horizontal coordinate, wL denotes the weighting factor for the reference sample located in the left reference line with the same vertical coordinate, and wTL denotes the weighting factor for the top-left reference sample of the current block, nScale specifies how fast weighting factors decrease along the axis (wL decreasing from left to right or wT decreasing from top to bottom), namely weighting factor decrement rate, and it is the same along x-axis (from left to right) and y-axis (from top to bottom) in current design. And 32 denotes the initial weighting factors for the neighboring samples, and the initial weighting factor is also the top (left or top-left) weightings assigned to top-left sample in current CB, and the weighting factors of neighboring samples in PDPC process should be equal to or less than this initial weighting factor.

For the planar mode, wTL=0; while for horizontal mode, wTL=wT; and for vertical mode wTL=wL. The PDPC weights can be calculated with add operations and shift operations. The value of pred'[x][y] can be computed in a single step using Eq. 1.

Figure 9B:
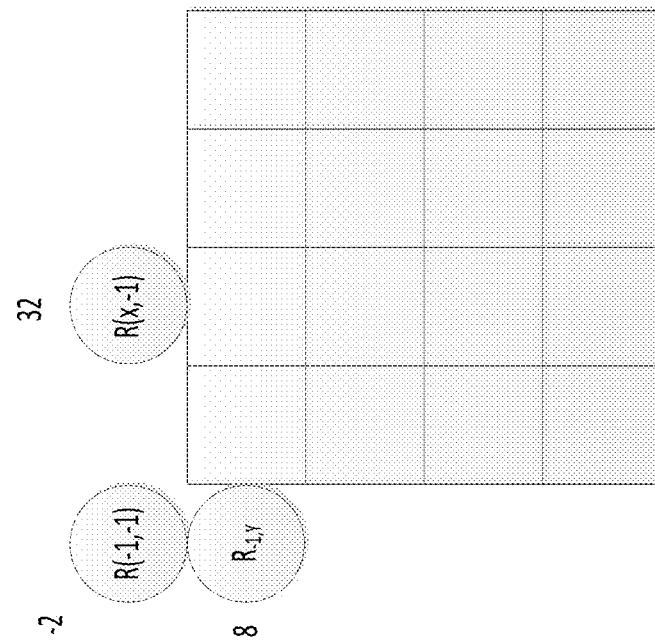
FIGS. 9A-9B show weight examples for position dependent prediction combination.
Figure 9A:
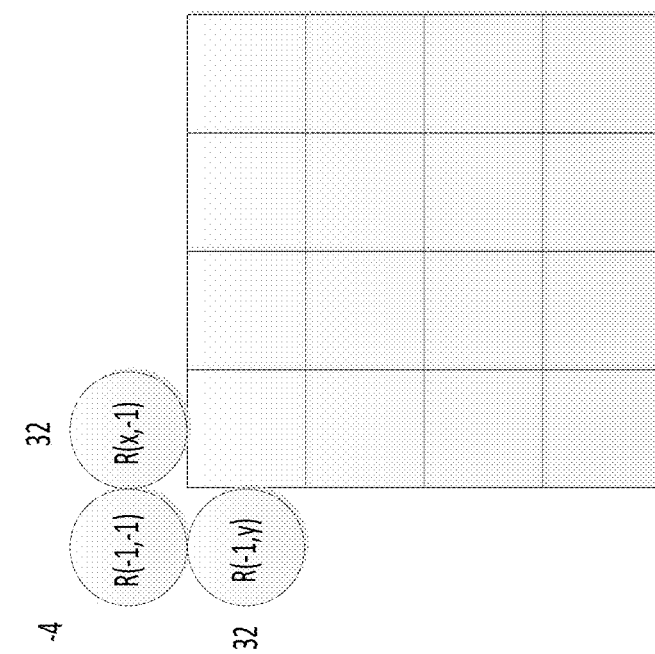

FIG. 9A shows weights for prediction sample at (0, 0) in DC mode. In the FIG. 9A example, the current block is a 4×4 block, width is 4, height is also 4, thus nScale is 0. Then, wT is 32, wL is 32, and −wTL is −4.

FIG. 9B shows weights for prediction sample at (1,0) in DC mode. In the FIG. 9B example, the current block is a 4×4 block, width is 4, height is also 4, thus nScale is 0. Then, wT is 32, wL is 8, and −wTL is −2.

In some examples, when PDPC is applied to DC, planar, horizontal, and vertical intra modes, additional boundary filters are not needed, such as the HEVC DC mode boundary filter or horizontal/vertical mode edge filters. For example, PDPC combines the un-filtered boundary reference samples and HEVC style intra prediction with filtered boundary reference samples.

More generally, in some examples, inputs to the PDPC process includes:

the intra prediction mode that is represented by predModeIntra;

the width of the current block that is represented nTbW;

the height of the current block that is represented by nTbH;

the width of the reference samples that is represented by refW;

the height of the reference samples that is represented by refH;

the predicted samples by HEVC style intra prediction that are represented by predSamples[x][y], with x=0 . . . nTbW−1 and y=0 . . . nTbH−1;

the unfiltered reference (also referred to as neighboring) samples p[x][y], with x=−1, y=−1 . . . refH−1 and x=0 . . . refW−1, y=−1; and the colour component of the current block that is represented by cIdx.

Further, the outputs of the PDPC process are the modified predicted samples predSamples'[x][y] with x=0 . . . nTbW−1, y=0 . . . nTbH−1.

Then, a scaling factor nScale is calculated by Eq. 6 which is similar to Eq. 5:

$$((\log 2(nTbW)+\log 2(nTbH)-2)>>2) \quad (Eq. 6)$$

Further, a reference sample array mainRef[x] with x=0 . . . refW is defined as the array of unfiltered reference samples above the current block and another reference sample array sideRef[y] with y=0 . . . refH is defined as the array of unfiltered reference samples to the left of the current block, and can be derived from unfiltered reference samples according to Eq. 7 and Eq. 8:

$$mainRef[x]=p[x][-1] \quad (Eq. 7)$$

$$sideRef[y]=p[-1][y] \quad (Eq. 8)$$

For each location (x,y) in the current block, the PDPC calculation uses a reference sample at the top that is denoted as refT[x][y], a reference sample at the left that is denoted as refL[x][y], and a reference sample at the corner p[−1,−1]. In some examples, the modified predicted sample is calculated by Eq. 9 in some examples, and the result is suitably clipped according to the cIdx variable that is indicative of the color component.

$$predSamples'[x][y]=(wL \times refL(x,y)+wT \times refT(x,y)-wTL \times p(-1,-1)+(64-wL-wT+wTL) \times predSamples[x][y]+32)>>6 \quad (Eq. 9)$$

The reference samples refT[x][y], refL[x][y], and the weights wL, wT and wTL can be determined based on the intra prediction mode predModeIntra.

In an example, when the intra prediction mode predModeIntra is equal to INTRA_PLANAR (e.g., 0, planar mode, mode 0), INTRA_DC (e.g., 1, DC mode, mode 1), INTRA_ANGULAR18 (e.g., 18, horizontal mode, mode 18 in the case of 67 intra prediction modes), or INTRA_ANGULAR50 (e.g., 50, vertical mode, mode 50 in the case of 67 intra prediction modes), reference samples refT[x][y], refL[x][y], and the weights wL, wT and wTL can be determined according to Eq. 10-Eq. 14:

$$refL[x][y]=p[-1][y] \quad (Eq. 10)$$

$$refT[x][y]=p[x][-1] \quad (Eq. 11)$$

$$wT[y]=32>>((y<<1)>>nScale) \quad (Eq. 12)$$

$$wL[x]=32>>((x<<1)>>nScale) \quad (Eq. 13)$$

$$wTL[x][y]=(predModeIntra==INTRA\_DC)?((wL[x]>>4)+(wT[y]>>4)):0 \quad (Eq. 14)$$

In another example, when the intra prediction mode predModeIntra is equal to INTRA_ANGULAR2 (e.g., 2, mode 2 in the case of 67 intra prediction mode) or INTRA_ANGULAR66 (e.g., 66, mode 66 in the case of 66 intra prediction mode), reference samples refT[x][y], refL[x][y], and the weights wL, wT and wTL can be determined according to (Eq. 15-Eq. 19):

$$refL[x][y]=p[-1][x+y+1] \quad (Eq. 15)$$

$$refT[x][y]=p[x+y+1][-1] \quad (Eq. 16)$$

$$wT[y]=32>>((y<<1)>>nScale) \quad (Eq. 17)$$

$$wL[x]=32>>((x<<1)>>nScale) \quad (Eq. 18)$$

$$wTL[x][y]=0 \quad (Eq. 19)$$

In another example, when the intra prediction mode predModeIntra is less than or equal to INTRA_ANGULAR10 (e.g., 10, mode 10 in the case of 67 intra prediction mode), for location (x, y), variables dXPos[y], dXFrac[y], dXInt[y] and dX[y] are derived based on a variable invAngle that is a function of the intra prediction mode predModeIntra. In an example, the invAngle can be determined based on a look-up table that stores a corresponding invAngle value to each intra prediction mode, and then the reference samples refT[x][y], refL[x][y], and the weights wL, wT and wTL are determined based on the variables dXPos[y], dXFrac[y], dXInt[y] and dX[y].

For example, the variables dXPos[y], dXFrac[y], dXInt[y] and dX[y] are determined according to (Eq. 20-23):

$$dXPos[y]=((y+1)\times invAngle+2)>>2 \quad (Eq. 20)$$

$$dXFrac[y]=dXPos[y] \;\&\; 63 \quad (Eq. 21)$$

$$dXInt[y]=dXPos[y]>>6 \quad (Eq. 22)$$

$$dX[y]=x+dXInt[y] \quad (Eq. 23)$$

Then, the reference samples refT[x][y], refL[x][y], and the weights wL, wT and wTL are determined according to Eq. 24-Eq. 28.

$$refL[x][y]=0 \quad (Eq. 24)$$

$$refT[x][y]=(dX[y]<refW-1)?((64-dXFrac[y])\times mainRef[dX[y]]+dXFrac[y]\times mainRef[dX[y]+1]+32)>>6:0 \quad (Eq. 25)$$

$$wT[y]=(dX[y]<refW-1)?32>>((y<<1)>>nScale):0 \quad (Eq. 26)$$

$$wL[x]=0 \quad (Eq. 27)$$

$$wTL[x][y]=0 \quad (Eq. 28)$$

In another example, when the intra prediction mode predModeIntra is greater than or equal to INTRA_ANGULAR58 (e.g., 58, mode 58 in the case of 67 intra prediction modes), variables dYPos[x], dYFrac[x], dYInt[x] and dY[x] are derived based on a variable invAngle that is a function of the intra prediction mode predModeIntra. In an example, the invAngle can be determined based on a look-up table that stores a corresponding invAngle value to each intra prediction mode, and then the reference samples refT[x][y], refL[x][y], and the weights wL, wT and wTL are determined based on the variables dYPos[x], dYFrac[x], dYInt[x] and dY[x].

For example, the variables dYPos[x], dYFrac[x], dYInt[x] and dY[x] are determined according to Eq. 29-33:

$$dYPos[x]=((x+1)\times invAngle+2)>>2 \quad (Eq. 29)$$

$$dYFrac[x]=dYPos[x]\;\&\;63 \quad (Eq. 30)$$

$$dYInt[x]=dYPos[x]>>6 \quad (Eq. 31)$$

$$dY[x]=x+dYInt[x] \quad (Eq. 32)$$

Then, the reference samples refT[x][y], refL[x][y], and the weights wL, wT and wTL are determined according to Eq. 33-Eq. 37.

$$refL[x][y]=(dY[x]<refH-1)?((64-dYFrac[x])\times sideRef[dY[x]]+dYFrac[x]\times sideRef[dY[x]+1]+32)>>6:0 \quad (Eq. 33)$$

$$refT[x][y]=0 \quad (Eq. 34)$$

$$wT[y]=0 \quad (Eq. 35)$$

$$wL[x]=(dY[x]<refH-1)?32>>>((x<<1)>>nScale):0 \quad (Eq. 36)$$

$$wTL[x][y]=0 \quad (Eq. 37)$$

In some examples, when the variable predModeIntra is between 11-57 and is not one of 18 and 50, then the refL[x][y], refT[x][y], wT[y], wL[y] and wTL[x][y] are all set equal to 0. Then, the values of the filtered samples filtSamples[x][y], with x=0 ... nTbW−1, y=0 ... nTbH−1 are derived as follows:

$$filtSamples[x][y]=clip1Cmp((refL[x][y]\times wL+refT[x][y]\times wT-p[-1][-1]\times wTL[x][y]+(64-wL[x]-wT[y]+wTL[x][y])\times predSamples[x][y]+32)>>6) \quad (Eq. 38)$$

It is noted that some PDPC processes include non-integer (e.g., floating point) operations that increase computation complexity. In some embodiments, the PDPC process includes relatively simple computations for the planar mode (mode 0), the DC mode (mode 1), the vertical mode (e.g., mode 50 in the case of 67 intra prediction modes), the horizontal mode (e.g., mode 18 in the case of 67 intra prediction modes), and the diagonal modes (e.g., mode 2, mode 66, and mode 34 in the case of 67 intra prediction modes), and the PDPC process includes relatively complex computations for the other modes.

In some embodiments, PDPC techniques can be similarly applied to inter prediction (or reconstructed samples of an inter coded CU), and the usage of PDPC techniques in inter prediction is referred to as inter PDPC. In an example, a flag that is referred to as interPDPC flag is signaled to indicate whether to apply the inter PDPC mode. When interPDPC is true, the inter PDPC is used, PDPC filtering process is applied to inter prediction samples (or reconstructed samples of an inter coded CU). It is noted that the inter PDPC uses both inter prediction and intra prediction techniques and the inter PDPC is also referred to as weighted intra inter prediction (WIIP) mode. In an example, Eq. 1 can be suitably modified for inter PDPC mode filtering. For example, pred[x][y] is modified to denote inter prediction value in the inter PDPC mode In some embodiments, for the chroma component of an intra coded block, the encoder selects the best chroma prediction modes among five modes including planar mode (mode index 0), DC mode (mode index 1), horizontal mode (mode index 18), vertical mode (mode index 50), diagonal mode (mode index 66) and a direct copy of the intra prediction mode for the associated luma component, namely DM mode. The mapping between intra prediction direction and intra prediction mode number for chroma is shown in Table 1.

TABLE 1

Mapping between intra prediction direction and intra prediction mode for chroma

| intra_chroma_pred_mode [xCb][yCb] | IntraPredModeY[xCb + cbWidth/2] [yCb + cbHeight/2] | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

To avoid duplicate mode, in some embodiments, the our modes other than are assigned according the intra prediction modes of the associated luma components. When the intra prediction mode number for the chroma component is 4, the intra prediction direction for the luma component is used for the intra prediction sample generation for the chroma component. When the intra prediction mode number for the chroma component is not 4 and it is identical to the intra prediction mode number for the luma component, the intra prediction direction of 66 is used for the intra prediction sample generation for the chroma component.

According to some aspects of the disclosure, inter-picture prediction (also referred to as inter prediction) includes merge mode and skip mode.

In the merge mode for inter-picture prediction, the motion data (e.g., motion vector) of a block is inferred instead of being explicitly signaled. In an example, a merge candidate list of candidate motion parameters is firstly constructed, then an index is signaled which identifies the candidate to be used.

In some embodiments, a merge candidate list includes a non sub-CU merge candidate list and a sub-CU merge candidate list. The non sub-CU merge candidates is constructed based on the spatial neighboring motion vectors, collocated temporal motion vectors, and history based motion vectors. The sub-CU Merge candidate list includes affine merge candidates and ATMVP merge candidates. The sub-CU merge candidate is used to derive multiple MVs for current CU and different part of the samples in current CU can have different motion vectors.

In the skip mode, the motion data of a block is inferred instead of being explicitly signaled and that the prediction residual is zero, i.e. no transform coefficients are transmitted. At the beginning of each CU in an inter-picture prediction slice, a skip_flag is signaled. The skip_flag indicates that the merge mode is used to derive the motion data, and no residual data is present in the coded video bitstream.

According to some aspects of the disclosure, intra and inter predictions can be suitably combined by coding techniques. One of the coding techniques to combine intra and inter prediction is referred to as combined inter/intra prediction (CIIP) that is also called a multi-hypothesis intra-inter prediction. The CIIP combines one intra prediction and one merge indexed prediction. In an example, when a CU is in the merge mode, a specific flag for intra mode is signaled. When the specific flag is true, an intra mode can be selected from an intra candidate list. For luma component, the intra candidate list is derived from 4 intra prediction modes including DC mode, planar mode, horizontal mode, and vertical mode, and the size of the intra mode candidate list can be 3 or 4 depending on the block shape. In an example, when the CU width is larger than twice of CU height, the horizontal mode is removed from the intra mode candidate list and when the CU height is larger than twice of CU width, vertical mode is removed from the intra mode candidate list. In some embodiments, an intra prediction is performed based on an intra prediction mode selected by an intra mode index and an inter prediction is performed based on a merge index. The intra prediction and the inter prediction are combined using weighted average. For chroma component, DM is always applied without extra signaling in some examples.

In some embodiments, the weights for combining the intra prediction and the inter prediction can be suitably determined. In an example, when DC or planar mode is selected or the coding block (CB) width or height is smaller than 4, equal weights are applied for inter prediction and intra prediction. In another example, for a CB with CB width and height larger than or equal to 4, when horizontal/vertical mode is selected, the CB is first vertically/horizontally split into four equal-area regions. Each region has a weight set, denoted as (w_intra$_i$, w_inter$_i$), where i is from 1 to 4. In an example, the first weight set (w_intra$_1$, w_inter$_1$)=(6, 2), the second weight set (w_intra$_2$, w_inter$_2$)=(5, 3), the third weight set (w_intra$_3$, w_inter$_3$)=(3, 5), and fourth weight set (w_intra$_4$, w_inter$_4$)=(2, 6), can be applied to a corresponding region. For example, the first weight set (w_intra$_1$, w_inter$_1$) is for the region closest to the reference samples and fourth weight set (w_intra$_4$, w_inter$_4$) is for the region farthest away from the reference samples. Then, the combined prediction can be calculated by summing up the two weighted predictions and right-shifting 3 bits.

Moreover, the intra prediction mode for the intra hypothesis of predictors can be saved for the intra mode coding of the following neighboring CBs when the neighboring CBs are intra coded.

In some embodiments, a technique referred to as bi-prediction with CU-level weight (BCW) is used. The BCW technique is also referred to as generalized bi-prediction (GBi). In an example, such as HEVC, the bi-prediction signal is generated by averaging two prediction signals obtained from two different reference pictures and/or using two different motion vectors. In another example, such as in VVC working draft and VTM, with BCW, the bi-prediction mode is extended beyond simple averaging to allow weighted averaging of the two prediction signals. In an example, such as in a VVC draft, GBi (generalized bi-prediction) is also referred to as bi prediction with CU-level weights (BCW). In the BWA/GBi/BCW mode, a CU level weighted prediction is performed in a CU. For example, when the BWA/GBi/BCW mode is enabled for a CU, the weighting can be signaled for that CU by a BCW index. For example, the bi-prediction $P_{bi\text{-}pred}$ is generated using (Eq. 39):

$$P_{bi\text{-}pred} = ((8-w) \times P_0 + w \times P_1 + 4) >> 3 \qquad (\text{Eq. 39})$$

where $P_0$ and $P_1$ denote motion compensated predictions using reference pictures in L0 and L1, respectively, w denotes weighting parameter for prediction using reference picture in L1 and represented in ⅛ precision in an example.

In a BWA/GBi/BCW implementation example, five weights are allowed in the weighted averaging bi-prediction, $w \in \{-2, 3, 4, 5, 10\}$. For each bi-predicted CU, the weight w is determined in one of a first method and a second method. In the first method, for a non-merge CU, the weight index is signalled after the motion vector difference. In the second method, for a merge CU, the weight index is inferred from neighbouring blocks based on the merge candidate index. In some examples, weighted averaging bi-prediction is only applied to CUs with 256 or more luma samples (i.e., CU width times CU height is greater than or equal to 256). For low-delay pictures, all 5 weights can be used. For non-low-delay pictures, only 3 weights ($w \in \{3,4,5\}$) are used in an example.

In some embodiments, for inter merge mode from spatial candidates and model inherited affine merge mode, the weight selection (BCW index) is inherited from the merge candidate. For other merge types, such as temporal merge candidates, HMVP candidates, SbTMVP candidates, constructed control-point based affine merge candidates, pairwise average merge candidates, etc., the BCW index is not inherited, and the default weight of ½ (or ⅘) can be used.

In some examples, such as AVC, HEVC, VVC and the like, weighted prediction (WP) is provided as a supported coding tool. In an example, WP can be used to improve the performance of inter prediction when the source material is subject to illumination variations, e.g. when using fading or cross-fading.

In some examples, according to WP, the inter prediction signal P is replaced by a linear weighted prediction signal P' (with weight w and offset o), for example according to (Eq. 40) for uni-prediction:

$$\text{Uni-prediction: } P' = w \times P + o \qquad (\text{Eq. 40})$$

For bi-prediction, inter prediction signal P0 is for reference L0, weight w0 and offset o0 are for the reference L0, and inter prediction signal P1 is for reference L1, weight w1 and offset o1 are for the reference L0, then the linear weighted prediction signal P' can be calculated according to (Eq. 41):

$$\text{Bi-prediction: } P' = (w0 \times P0 + o0 + w1 \times P1 + o1)/2 \quad \text{(Eq. 41)}$$

The applicable weights and offsets are selected by the encoder and are conveyed within the bitstream from encoder to the decoder. L0 and L1 suffixes define List0 and List1 of the reference pictures list, respectively. Bit depth is maintained to 14-bit accuracy (in HEVC Version 1) before averaging the prediction signals, as for interpolation filters.

In some embodiments, WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied).

According to some aspects of the disclosure, a motion refinement technique that is referred to as bi-directional optical flow (BDOF) mode is used in inter prediction. BDOF is also referred to as BIO in some examples. BDOF can be used to refine a bi-prediction signal of a CU at a 4×4 subblock level. BDOF can be applied to a CU when the CU satisfies certain conditions. In an example, the conditions include: (i) the CU's height is not 4, and the CU size is not 4×8, (ii) the CU is not coded using affine mode or the ATMVP merge mode, (iii) the CU is coded using a "true" bi-prediction mode, e.g., one of the two reference pictures is prior to the current picture in a display order and the other is after the current picture in the display order. BDOF is only applied to a luma component in some examples. In an example, the conditions include: (i) the CU is coded using the "true" bi-prediction mode, e.g., one of the two reference pictures is prior to the current picture in a display order and the other is after the current picture in the display order, (ii) the distances (i.e., POC differences) from the two reference pictures to the current picture are identical, (iii) the two reference pictures are short-term reference pictures, (iv) the CU is not coded using affine mode or the ATMVP merge mode, (v) the CU has more than 64 luma samples, (vi) a CU height and a CU width are larger than or equal to 8 luma samples, (vii) a BCW weight index indicates an equal weight, (viii) a weighted prediction (WP) is not enabled for the current CU, and (ix) a CIIP mode is not used for the current CU.

In an embodiment, the BDOF mode is only applied to a luma component. The motion refinement in the BDOF mode is based on the optical flow concept, which assumes that the motion of an object is smooth. For each 4×4 subblock (e.g., a subblock (1020) in a CU (1010) in FIG. 10), a motion refinement ($\Delta mv_x, \Delta mv_y$) is calculated by minimizing a difference between the L0 and L1 prediction samples. The motion refinement is then used to adjust the bi-predicted sample values in the 4×4 sub-block (e.g., the subblock (1020)). The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j),$$

k=0,1, of the two prediction signals are computed by directly calculating the difference between two neighboring samples, e.g., $$\frac{\partial I^{(k)}}{\partial x}(i, j) = (I^{(k)}(i+1, j) - I^{(k)}(i-1, j)) \gg \text{shift1} \quad \text{(Eq. 42)}$$

$$\frac{\partial I^{(k)}}{\partial y}(i, j) = (I^{(k)}(i, j+1) - I^{(k)}(i, j-1)) \gg \text{shift1}$$

where $I^{(k)}(i, j)$ is the sample value at coordinate (i, j) of the prediction signal in list k, k=0, 1, and the parameter shift1 is calculated based on a luma bit depth, bitDepth. In an example, shift1=max(6, bitDepth−6). In some examples, shift 1 is equal to a maximum of 2 and (14-bitDepth). In an example, calculations in Eq. 42 can be adapted to calculations in Eqs. 43-44.

$$\frac{\partial I^{(k)}}{\partial x}(i, j) = ((I^{(k)}(i+1, j) \gg \text{shift1}) - (I^{(k)}(i-1, j) \gg \text{shift1})) \quad \text{(Eq. 43)}$$

$$\frac{\partial I^{(k)}}{\partial y}(i, j) = ((I^{(k)}(i, j+1) \gg \text{shift1}) - (I^{(k)}(i, j-1) \gg \text{shift1})) \quad \text{(Eq. 44)}$$

In an example, auto-correlations and cross-correlations of gradients, $S_1$, $S_2$, $S_3$, $S_5$ and $S_6$, are calculated as below.

$$S_1 = \Sigma_{(i,j) \in \Omega} \psi_x(i,j) \cdot \psi_x(i,j),$$

$$S_3 = \Sigma_{(i,j) \in \Omega} \theta(i,j) \cdot \psi_x(i,j)$$

$$S_2 = \Sigma_{(i,j) \in \Omega} \psi_x(i,j) \cdot \psi_y(i,j)$$

$$S_5 = \Sigma_{(i,j) \in \Omega} \psi_y(i,j) \cdot \psi_y(i,j),$$

$$S_6 = \Sigma_{(i,j) \in \Omega} \theta(i,j) \cdot \theta_y(i,j) \quad \text{(Eq. 45)}$$

where $$\psi_x(i, j) = \left(\frac{\partial I^{(1)}}{\partial x}(i, j) + \frac{\partial I^{(0)}}{\partial x}(i, j)\right) \gg n_a \quad \text{(Eq. 46)}$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = (I^{(1)}(i, j) \gg n_b) - (I^{(0)}(i, j) \gg n_b)$$

and $\Omega$ is a 6×6 window (e.g., (1040)) around the 4×4 subblock (e.g., the subblock (1020)), and
the values $n_a$ and $n_b$ are set equal to min(5, bitDepth−7) and min(8, bitDepth−4), respectively.

In an example, the auto-correlations and cross-correlations of gradients, $S_1$, $S_2$, $S_3$, $S_5$ and $S_6$, are calculated as below using Eq. 47.

$$S_1 = \Sigma_{(i,j) \in \Omega} \text{Abs}(\psi_x(i,j)),$$

$$S_3 = \Sigma_{(i,j) \in \Omega} \theta(i,j) \cdot \text{Sign}(\psi_x(i,j))$$

$$S_2 = \Sigma_{(i,j) \in \Omega} \psi_x(i,j) \cdot \text{Sign}(\psi_y(i,j))$$

$$S_5 = \Sigma_{(i,j) \in \Omega} \text{Abs}(\psi_y(i,j)),$$

$$S_6 = \Sigma_{(i,j) \in \Omega} \theta(i,j) \cdot \text{Sign}(\psi_y(i,j)) \quad \text{(Eq. 47)}$$

where Ω is a 6×6 window (e.g., (1040)) around the 4×4 subblock (e.g., the subblock (1020)), and the values $n_a$ and $n_b$ are set equal to min(1, bitDepth−11) and min(4, bitDepth−8), respectively.

The motion refinement or MVR ($\Delta mv_x$, $\Delta mv_y$) can be derived using the auto-correlations and cross-correlations using the following.

$$\Delta mv_x = S_1 > 0 ? \text{clip3}(-th_{BIO}', th_{BIO}', -((S_3 \cdot 2^{nb-na}) >> \lfloor \log_2 S_1 \rfloor)) : 0 \quad (Eq.48)$$

$$\Delta mv_y = S_5 > 0 ? \text{clip3}(-th_{BIO}', th_{BIO}', -((S_6 \cdot 2^{nb-na} - ((v_x S_{2,m}) << n_{S_2} + v_x S_{2,s})/2) >> \lfloor \log_2 S_5 \rfloor)) : 0 \quad (Eq.49)$$

where $$S_{2,m} = S_2 \gg n_{S_2}, S_{2,s} = S_2 \& (2^{n_{S_2}} - 1),$$

$\lfloor \cdot \rfloor$ is the floor function, and $n_{S_2}=12$. In an example, $th_{BIO}' = 2^{\max(5,BD-7)}$. In an example, $th_{BIO}' = 2^{13-BD}$.

Based on the motion refinement and the gradients, the following adjustment (or prediction refinement) b(x,y) can be calculated for each sample in the 4×4 subblock:

$$b(x, y) = rnd\left(\frac{\left(\Delta mv_x \left(\frac{\partial I^{(1)}(x, y)}{\partial x} - \frac{\partial I^{(0)}(x, y)}{\partial x}\right) + \Delta mv_y \left(\frac{\partial I^{(1)}(x, y)}{\partial y} - \frac{\partial I^{(0)}(x, y)}{\partial y}\right) + 1\right)}{(2)}\right) \quad (Eq.~50)$$

In an example, the above calculations in Eq. (50) can be adapted to the following calculations in Eq. 51.

$$b(x, y) = rnd\left(\left(\Delta mv_x \left(\frac{\partial I^{(1)}(x, y)}{\partial x} - \frac{\partial I^{(0)}(x, y)}{\partial x}\right)\right)/2\right) + rnd\left(\left(\Delta mv_y \left(\frac{\partial I^{(1)}(x, y)}{\partial y} - \frac{\partial I^{(0)}(x, y)}{\partial y}\right)\right)/2\right) \quad (Eq.~51)$$

where the function 'rnd' represents a rounding operation.

The BDOF samples of the CU can be calculated by adjusting the bi-prediction samples as follows:

$$pred_{BDOF}(x,y) = (I^{(0)}(x,y) + I^{(1)}(x,y) + b(x,y) + o_{offset}) >> \text{shift} \quad (Eq.~52)$$

In an embodiment, the values are selected such that multipliers in the BDOF process do not exceed 15-bit, and the maximum bit-width of the intermediate parameters in the BDOF process is kept within 32-bit.

In an example, to derive the gradient values, prediction samples $I^{(k)}(i,j)$ in the list k (k=0, 1) that are outside the current CU boundaries are to be generated.

Figure 10:
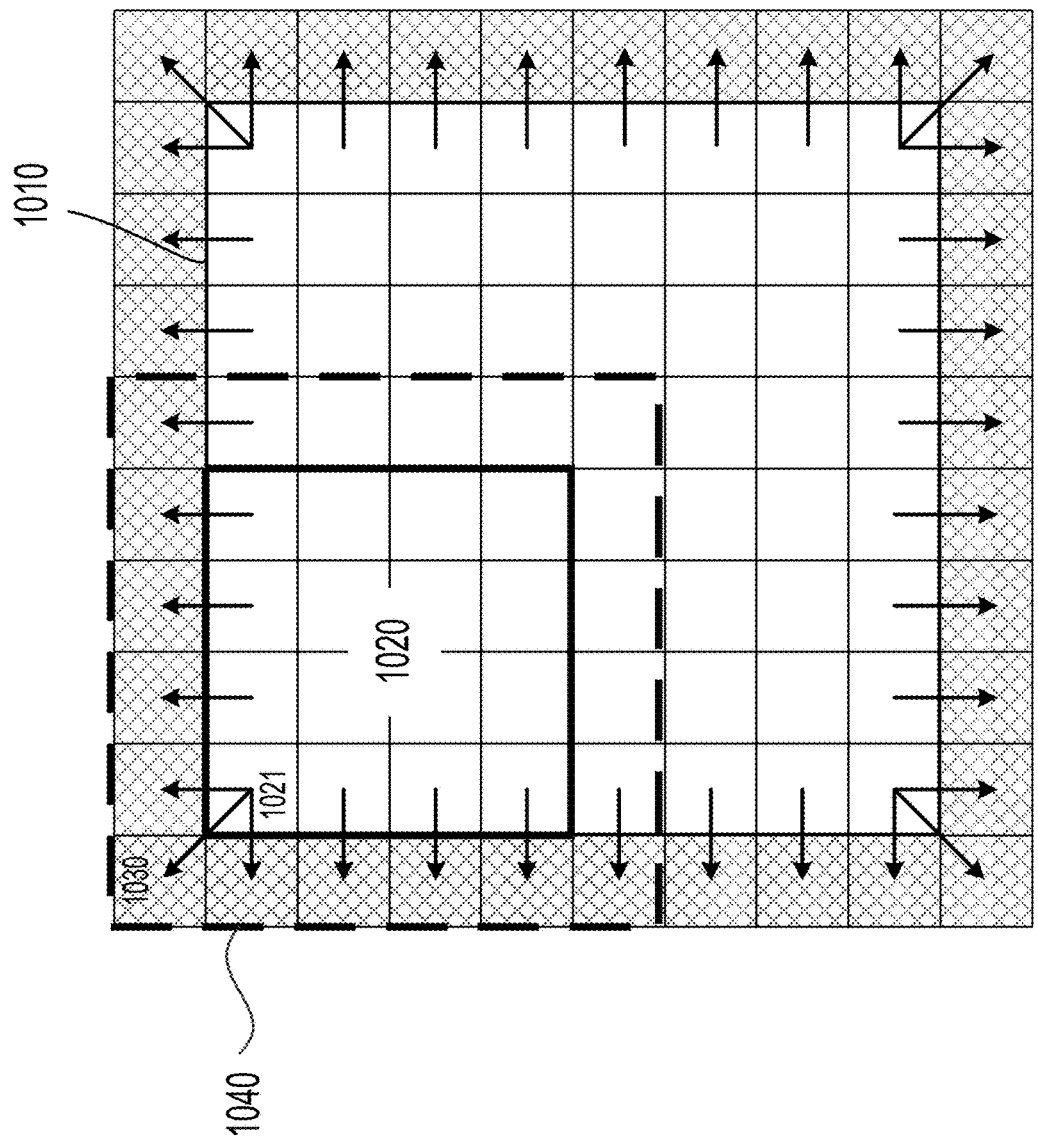
FIG. 10 shows an example illustrating bi-directional optical flow according to some embodiments.

FIG. 10 shows an example illustrating BDOF according to some embodiments. Referring to FIG. 10, the BDOF (e.g., in VVC) can use an extended row/column around boundaries of a CU (1010). In order to control a computational complexity of generating out-of-boundary prediction samples (e.g., a prediction for a sample (1030) or a prediction sample (1030)), prediction samples in the extended area (patterned areas in FIG. 10) can be generated by taking reference samples at nearby integer positions (e.g., using a floor operation on the coordinates) directly without interpolation. In an example, an 8-tap motion compensation interpolation filter (also referred to as an 8-tap interpolation filter) is used to generate prediction samples within the CU (1010) (white positions). In an example shown in FIG. 10, the CU (1010) includes 8×8 samples. In an example, the extended sample values are used in gradient calculations only. The gradient calculations can use Eq. 42 or Eqs. 43-44, as described above.

Referring to FIG. 10, for the remaining steps (e.g., Eqs. 45-47) in the BDOF process, if prediction sample(s) and gradient value(s) outside the CU boundaries are used, the prediction sample(s) and the gradient value(s) outside the CU boundaries can be padded (e.g., repeated) from corresponding nearest neighbors as indicated by arrows in FIG. 10. For example, the prediction sample and the gradient values at (1030) can be padded from the corresponding prediction sample and the gradient values at (1021).

In an embodiment, when the width and/or the height of a CU is larger than 16 luma samples, the CU can be split into subblocks with a width and/or a height equal to 16 luma samples, and the subblock boundaries can be treated as the CU boundaries in the BDOF process. For example, a maximum unit size for the BDOF process is limited to 16×16 samples. In an example, for a subblock, the BDOF process can be skipped. In an example, when the SAD between the initial L0 and L1 prediction samples is smaller than a threshold, the BDOF process is not applied to the subblock. The threshold can be set equal to (8×W×(H>>1)) where W indicates a subblock width and H indicates a subblock height. To avoid the additional complexity of SAD calculation, the SAD between the initial L0 and L1 prediction samples calculated in a DMVR process can be reused here.

If BCW is enabled for a current CU (e.g., a block), e.g., a BCW weight index indicates an unequal weight, the BDOF mode can be disabled for the current CU. Similarly, if the WP mode is enabled for a current CU (e.g., a block), e.g., a luma_weight_lx_flag is 1 for either of two reference pictures for the current CU, the BDOF mode can be disabled for the current CU. When a current CU (e.g., a block) is coded with a symmetric MVD mode or a CIIP mode, the BDOF mode can be disabled for the current CU.

According to an aspect of the disclosure, a MV refinement (MVR) can be restricted to be, for example, in a form of $+2^N$ or $-2^N$, and thus multiplication operations can be replaced by shifting operations to reduce calculation complexity and to improve coding efficiency. N can be any suitable integer.

According to an aspect of the disclosure, decoder side motion vector refinement (DMVR) is one of the decoder side motion vector derivation (DMVD) techniques and is used to improve/refine MV based on starting points.

In some examples, a bilateral matching based decoder side motion vector refinement can be applied to increase accuracy of the motion vectors of the merge mode. In bi-prediction operation, a refined MV is searched around the initial MVs in the reference picture list L0 and reference picture list L1. The bilateral matching method calculates the distortion between the two candidate blocks in the reference picture list L0 and list L1.

In an example, in the case of bi-prediction operation, for the prediction of one block region, two prediction blocks can be formed respectively using an MV0 from a first reference picture candidate list L0 and an MV1 from a second reference picture candidate list L1. In the DMVR method, the two motion vectors MV0 and MV1 of the bi-prediction are further refined by a bilateral template matching process. The bilateral template matching applied in the decoder to perform a distortion-based search between the bilateral template and the reconstruction samples in the reference pictures to obtain a refined MV without transmission of additional motion information.

Figure 11:
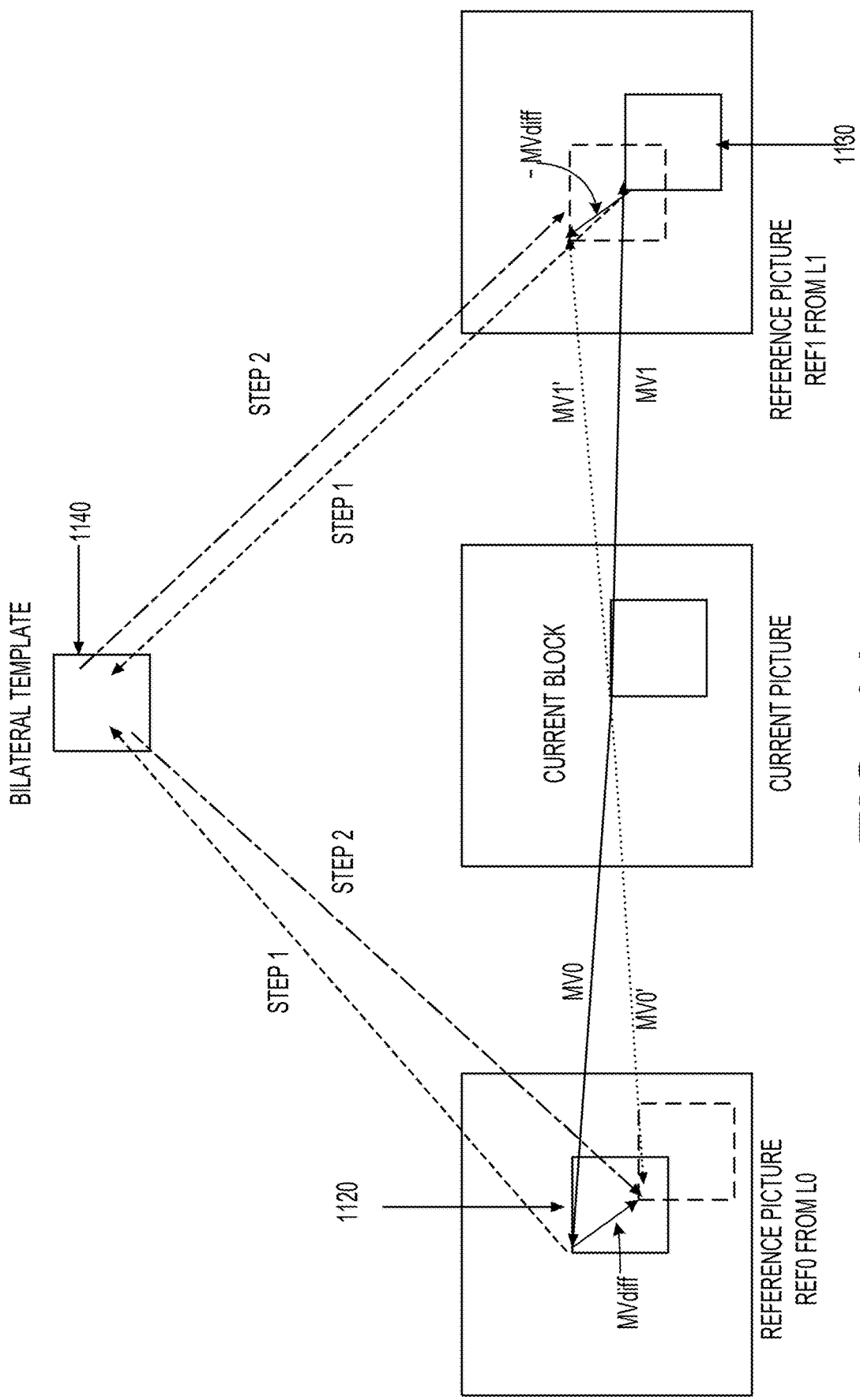
FIG. 11 shows an example of decoder side motion vector refinement (DMVR) that is based on bilateral template matching.

FIG. 11 shows an example of DMVR that is based on bilateral template matching. In an example, the bilateral template (1140) is generated as the weighted combination (i.e. average) of the two prediction blocks (1120) and (1130), from the initial MV0 from the first reference picture candidate list L0 and MV1 of the second reference picture candidate list L1, respectively, as shown in FIG. 11. The template matching operation includes calculating cost measures between the generated template (1140) and the sample region (around the initial prediction block) in the reference pictures Ref0 and Ref1. For each of the two reference pictures Ref0 and Ref1, the MV that yields the minimum template cost is considered as the updated MV of that list to replace the original MV. For example, MV0' replaces MV0, and MV1' replaces MV1. In some examples, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 11, are used for generating the final bi-prediction results for the current block. A sum of absolute differences (SAD) can be used as the cost measure.

In some examples, the DMVR is applied for the CUs which are coded with certain mode requirements. For example, (1) the DMVR is applied to CUs in CU level merge mode with bi-prediction MV; (2) one reference picture is in the past and another reference picture is in the future with respect to the current picture; (3) the distances (i.e. picture order count (POC) difference) from both reference pictures to the current picture are same; and (4) the CU has more than 64 luma samples and CU height is more than 8 luma samples.

The refined MV derived by DMVR process is used to generate the inter prediction samples and also used in temporal motion vector prediction for future pictures coding. While the original MV is used in deblocking process and also used in spatial motion vector prediction for future CU coding.

In some embodiments, based on signals in the received bitstream, a pair of merge candidates is determined and used as input to DMVR process. For example, the pair of merge candidates is denoted as initial motion vectors (MV0, MV1). In some examples, the search points that are searched by DMVR obey the motion vector difference mirroring condition. In other words, the points that are checked by DMVR, denoted by a pair of candidate motion vectors (MV0', MV1'), obey (Eq. 53) and (Eq. 54):

$$MV0'=MV0+MV_{diff} \quad \text{(Eq. 53)}$$

$$MV1'=MV1-MV_{diff} \quad \text{(Eq. 54)}$$

where $MV_{diff}$ denotes the motion vector difference between a candidate motion vector and an initial motion vector in one of the reference pictures.

In some embodiments, a technique that is referred to as local illumination compensation (LIC) can be used in video coding. LIC is based on a linear model for illumination changes, using parameters, such as a scaling factor denoted by (a) and an offset denoted by (b). LIC can be enabled or disabled adaptively for each inter-mode coded coding unit (CU).

In an embodiment, when LIC is applied to a CU, the scaling factor (a) and the offset (b) can be derived using a least square error method based on the neighboring samples of the current CU and their corresponding reference samples.

Figure 12:
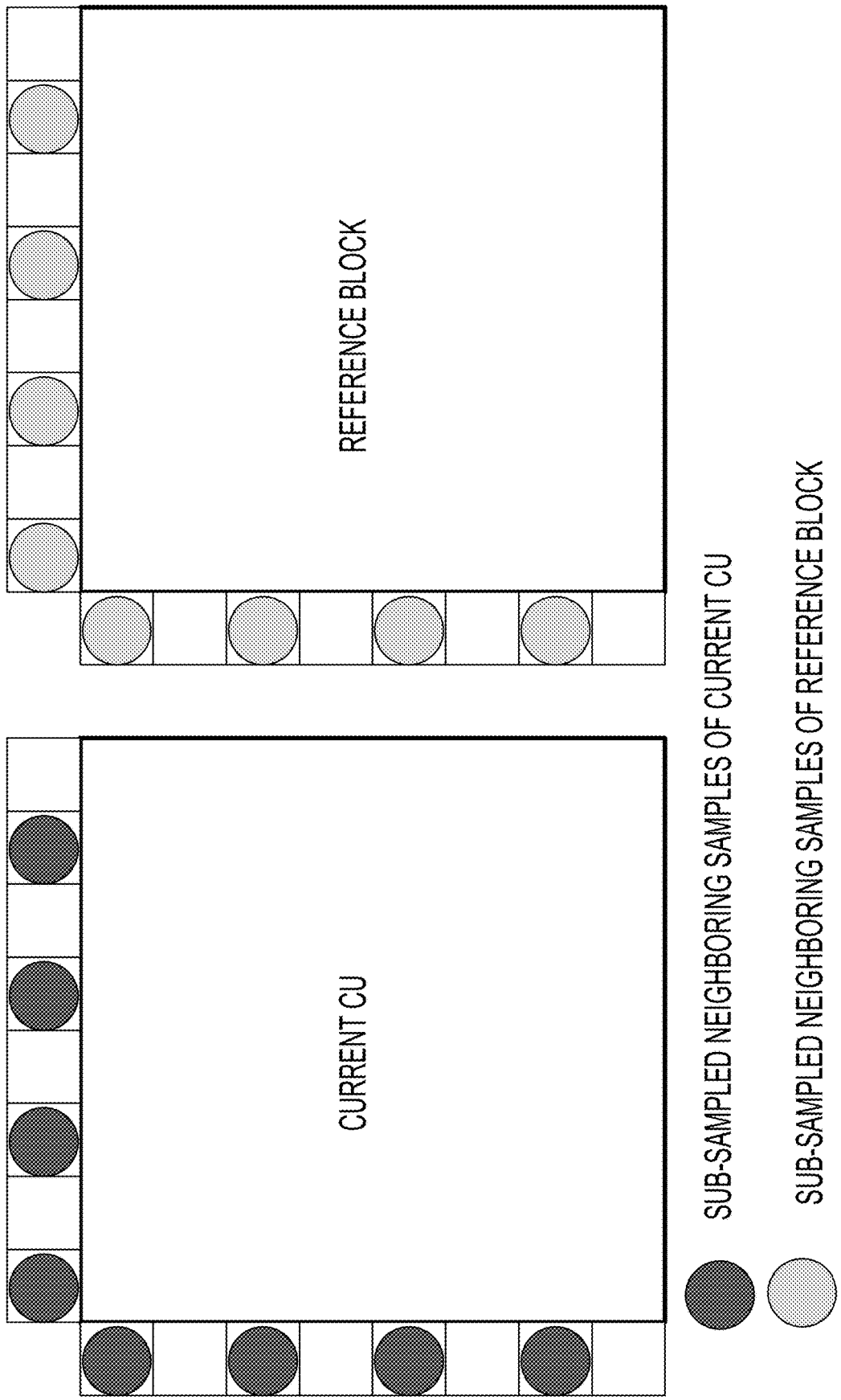
FIG. 12 shows a diagram of neighboring samples of a current coding unit and a reference block for the current coding unit.

FIG. 12 shows a diagram of neighboring samples of a current CU and a reference block for the current CU. In the FIG. 12 example, neighboring samples of the current CU and the reference block are sub-sampled, for example using 2:1 subsampling. In an example, the corresponding samples for the subsampled (2:1 subsampling) neighboring samples of the current CU can be identified by motion information of the current CU or sub-CU in the reference picture. The illumination compensation (IC) parameters (e.g., scaling factor and offset) can be derived and applied for each prediction direction separately.

In an example, when a current CU is coded with merge mode, the LIC flag is copied from neighboring blocks, in a way similar to motion information copy in merge mode. In another example, an LIC flag is signaled for the CU to indicate whether to apply LIC or not.

In some embodiments, when LIC is enabled for a picture, additional CU level rate distortion (RD) check is performed to determine whether to apply LIC on a CU or not. When LIC is enabled for a CU, mean-removed sum of absolute difference (MR-SAD) and mean-removed sum of absolute Hadamard-transformed difference (MR-SATD) can be used, instead of SAD and SATD, for integer pixel based motion search and fractional pixel based motion search, respectively.

In some embodiments, non-separable secondary transform (NSST) techniques can be used. In an embodiment, the non-separable secondary transform can be mode-dependent. In some examples, NSST can be performed between a forward core (primary) transform and a quantization at an encoder side and between a de-quantization and an inverse core (primary) transform at a decoder side. For example, to keep a low complexity, a NSST is applied to low frequency coefficients after a primary transform (or a core transform). When both a width (W) and a height (H) of a transform coefficient block are larger than or equal to 8, an 8×8 NSST is applied to atop-left 8×8 region of the transform coefficients block. Otherwise, when either the width W or the height H of the transform coefficient block is 4, a 4×4 NSST is applied, and the 4×4 NSST is performed on a top-left min(8,W)×min(8,H) region of the transform coefficient block. The above transform selection method is applied for both luma and chroma components in an example.

Specifically, in an embodiment, a matrix multiplication implementation of a NSST is described as follows using a 4×4 input block as an example. The 4×4 input block X is shown as in (Eq. 55)

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{(Eq. 55)}$$

Then, the input block X can be represented as a vector $\vec{X}$ in (Eq. 56) where $$\vec{X}=[X_{00}\,X_{01}\,X_{02}\,X_{03}\,X_{10}\,X_{11}\,X_{12}\,X_{13}\,X_{20}\,X_{21}\,X_{22}\,X_{23}\,X_{30}\,X_{31}\,X_{32}\,X_{33}]T \quad \text{(Eq. 56)}$$

In some embodiment, the non-separable transform is calculated as $\vec{F}=T\cdot\vec{Z}$, where $\vec{F}$ denotes a transform coefficient vector, and T denotes a 16×16 transform matrix (transform kernel). The 16×1 transform coefficient vector $\vec{F}$ is subsequently reorganized as a 4×4 block using a scanning order (for example, a horizontal scanning order, a vertical scanning order or a diagonal scanning order) for the input block X. Coefficients with smaller indices can be placed with smaller scanning indices in the 4×4 coefficient block. In some embodiments, a Hypercube-Givens Transform (HyGT) with a butterfly implementation can be used instead of the matrix multiplication described above to reduce the complexity of the NSST.

In some implementation examples, 35×3 non-separable secondary transforms are available for both 4×4 and 8×8 block sizes, where 35 is a number of transform sets associated with the intra prediction modes, and 3 is a number of NSST candidates for each intra prediction mode.

FIG. 13 shows an exemplary mapping (1300) from an intra prediction mode to a respective transform set. A transform set applied to luma/chroma transform coefficients is specified by a corresponding luma/chroma intra prediction mode, according to the mapping (1300) from an intra prediction mode to a transform set index. For an intra prediction mode larger than 34, which corresponds to a diagonal prediction direction, a transform coefficient block is transposed before/after the NSST at the encoder/decoder, respectively.

For each transform set, a selected NSST candidate can be further specified by an explicitly signaled CU level NSST index. The CU level NSST index is signaled in a bitstream for each intra coded CU after transform coefficients and a truncated unary binarization is used for the CU level NSST index. For example, a truncated value is 2 for the planar or the DC mode (planar and DC modes are referred to as non-angular prediction mode), and 3 for an angular intra prediction mode. In an example, the CU level NSST index is signaled only when there is more than one non-zero coefficient in the CU. The default value is zero and not signaled, indicating that a NSST is not applied to the CU. Each of values 1-3 indicates which NSST candidate is to be applied from the transform set.

In some embodiments, a NSST is not applied for a block coded with a transform skip mode. When the CU level NSST index is signaled for a CU and not equal to zero, a NSST is not used for a block that is coded with the transform skip mode in the CU. When the CU with blocks of all components are coded in a transform skip mode or a number of non-zero coefficients of non-transform-skip mode CBs is less than 2, the CU level NSST index is not signaled for the CU.

In some embodiments, NSST can be suitable modified. A variant for NSST is referred to as reduced secondary transform (RST) which is an alternative design of non-separable secondary transform. RST can be referred to as low-frequency non-separable secondary transform (LFNST) in some examples. RST is a variant of NSST and uses transform zero-out scheme.

In an example (e.g., in JVET-N0193), 4 transform sets are applied, and each transform set includes three RST transform cores, which can be either size 16×48 (or 16×64) (applied for transform coefficient block with height and width both being greater than or equal to 8) or 16×16 (applied for transform coefficient block with either height or width being equal to 4). For notational convenience, the 16×48 (or 16×64) transform is denoted as RST8×8 and the 16×16 transform is denoted as RST4×4.

Figure 14:
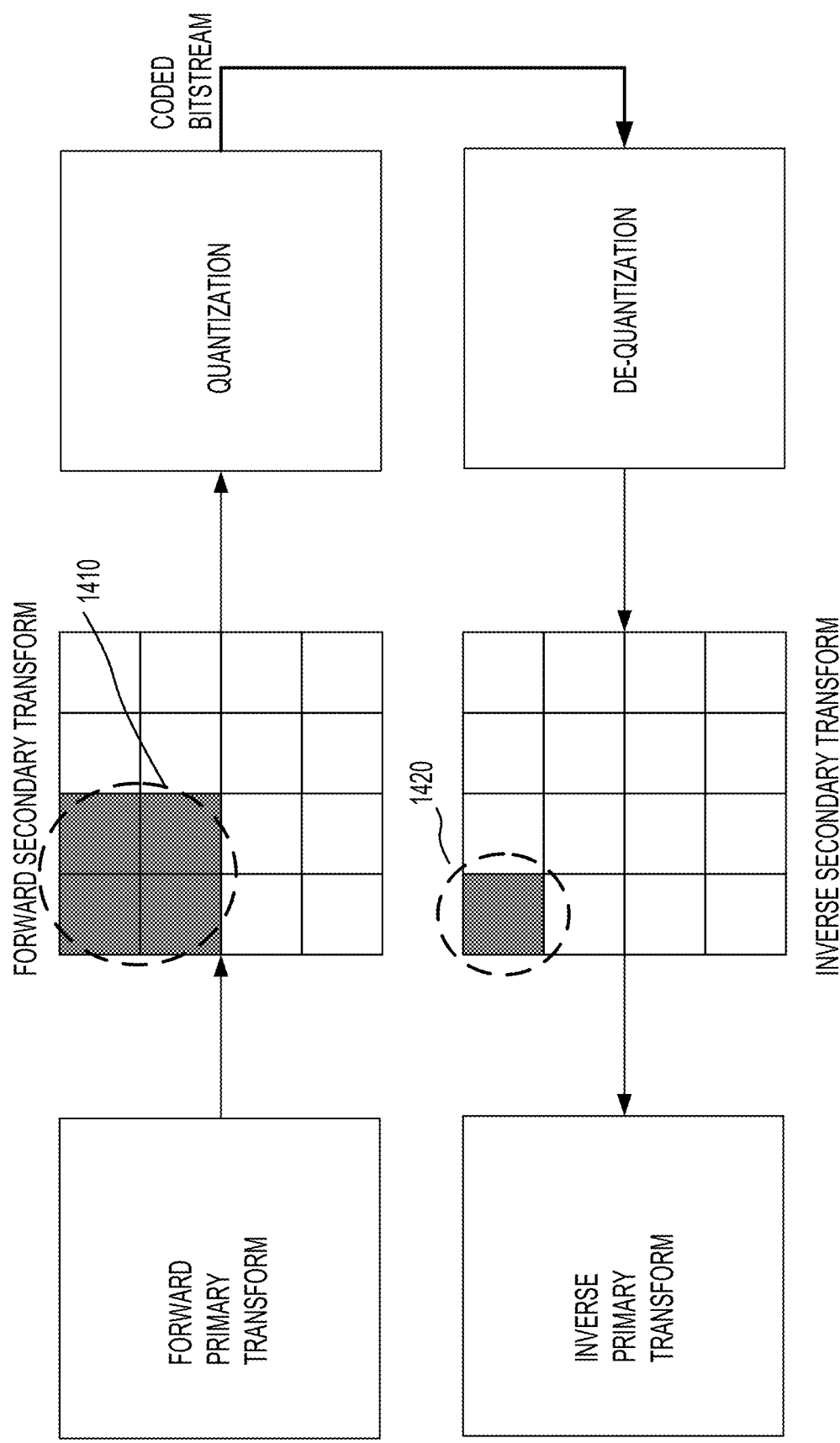
FIG. 14 shows an example using a 16×64 transform core according to an embodiment of the disclosure.

FIG. 14 shows an example using a 16×64 transform core according to an embodiment of the disclosure. For example, at the encoder side, 16×64 transform is applied to the portion (1410) which is the top left 8×8 region of the transform coefficients block, and the results are 16 coefficients. Thus, at the decoder side, the inverse RST is applied on the portion (1420) which includes 16 coefficients at the top left 4×4 region.

Figure 15:
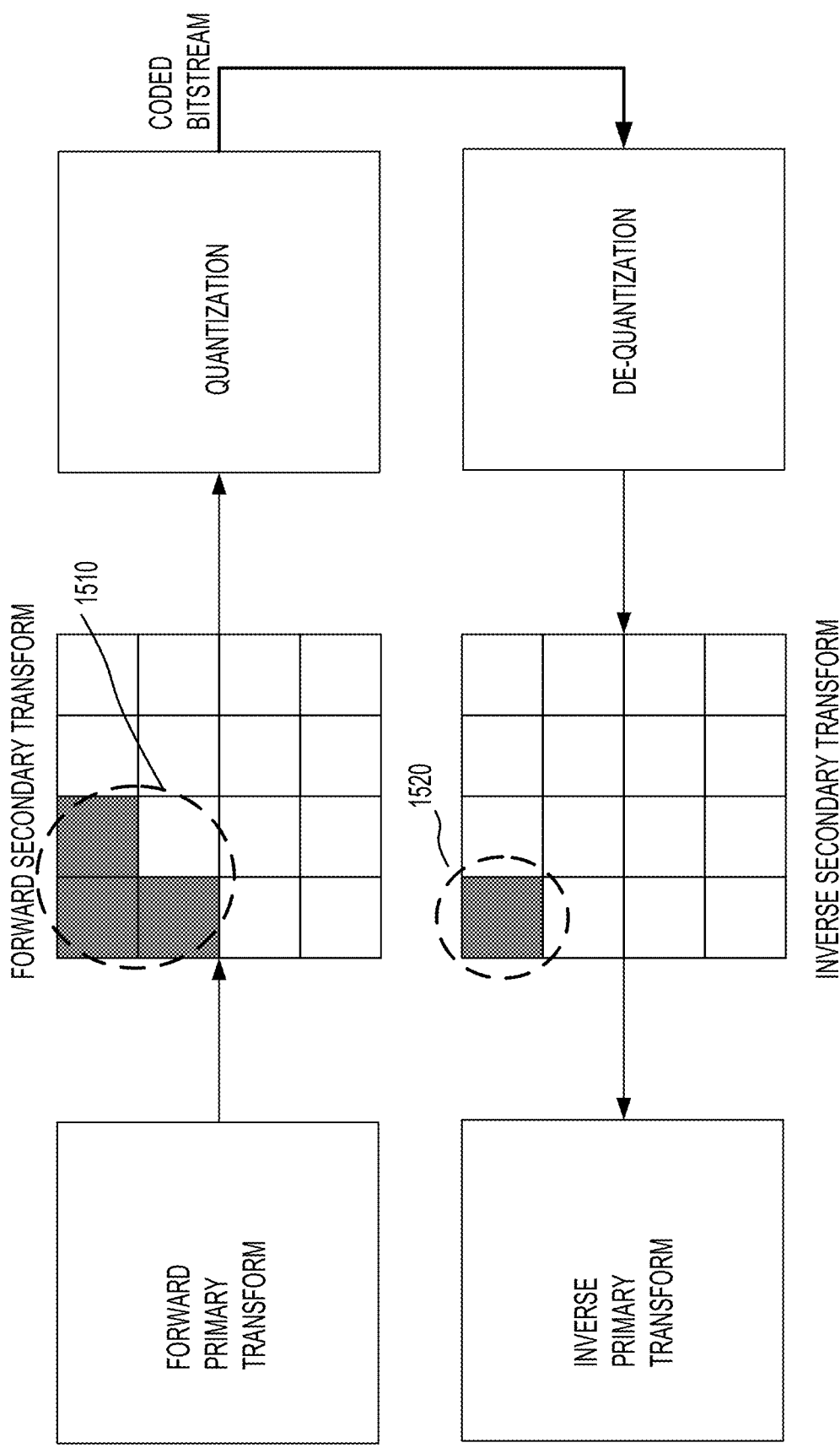
FIG. 15 shows an example using a 16×48 transform core according to an embodiment of the disclosure.

FIG. 15 shows an example using 16×48 transform core according to an embodiment of the disclosure. For example, at the encoder side, 16×48 transform is applied to the portion (1510) which is the top left grey region that includes 3 of 4×4 blocks of the transform coefficients block, and the results are 16 coefficients. Thus, at the decoder side, the inverse RST is applied on the portion (1520) which includes 16 coefficients at the top left 4×4 region.

Generally, the main idea of a reduced transform (RT) is to map an N dimensional vector to an R dimensional vector in a different space, where R/N (R<N) is the reduction factor.

FIG. 16 shows a RST matrix that is an R×N matrix. The RST matrix includes R rows of the transform that are R bases of the N dimensional space. The inverse transform matrix for RT is the transpose of the forward transform.

For example, the RST8×8 with a reduction factor of 4 (¼ size) can be applied. For conventional 8×8 non-separable transform matrix size, 64×64 transform matrix needs to be applied. For the reduced transform RST8×8, 16×64 direct matrix is used. In other words, the 64×16 inverse RST matrix is used at the decoder side to generate core (primary) transform coefficients in 8×8 top-left regions. The forward RST8×8 uses 16×64 (or 8×64 for 8×8 block) matrices so that the reduced transform produces non-zero coefficients only in the top-left 4×4 region within the given 8×8 region. In other words, when RST is applied then the 8×8 region except the top-left 4×4 region will have only zero coefficients. For RST4×4, 16×16 (or 8×16 for 4×4 block) direct matrix multiplication is applied.

In some embodiments, such as for RST8×8, to further reduce the transform matrix size, instead of the using the whole top-left 8×8 coefficients as input for calculating secondary transform, the top-left three 4×4 coefficients are used as the input for calculating secondary transform.

Figure 17B:
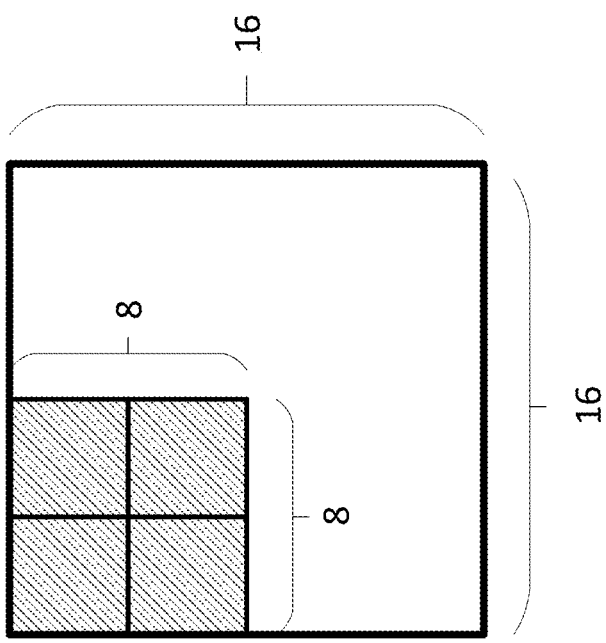
FIGS. 17A-B show diagram for illustrating examples of reduced secondary transform.
Figure 17A:
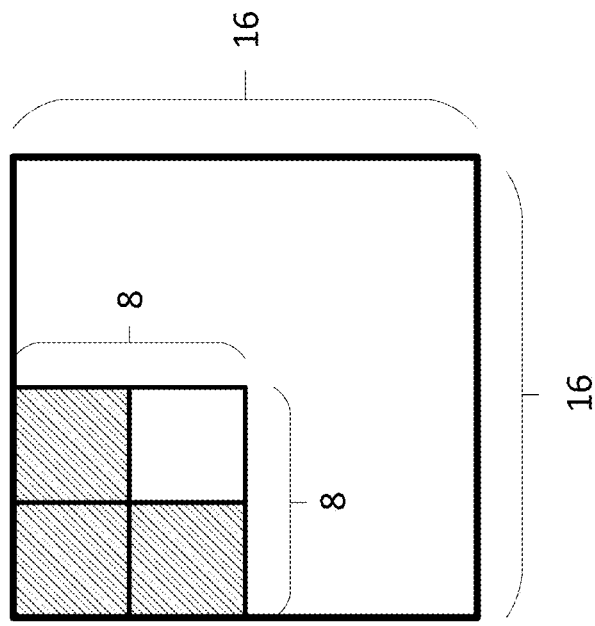

FIG. 17A shows an 16×16 block (e.g., coefficients block after primary transform). In an example, RST8×8 can be applied to the top left 8×8 region (in diagonal stripes) using 16×64 transform matrices.

FIG. 17B shows an 16×16 block (e.g., coefficients block after primary transform). In an example, RST8×8 can be applied to the top left region in diagonal stripes using 16×48 transform matrices.

In some embodiments, an inverse RST is conditionally applied when certain conditions are satisfied, such as a first condition that requires that the block size is greater than or equal to the given threshold (e.g., W>=4 && H>=4) and a second condition that requires that transform skip mode flag is equal to zero.

In some examples, when both width (W) and height (H) of a transform coefficient block is greater than 4, then the RST8×8 is applied to the top-left 8×8 region of the transform coefficient block. Otherwise, the RST4×4 is applied on the top-left min(8, W) x min(8, H) region of the transform coefficient block.

In some embodiments, RST index is used. When the RST index is equal to 0, RST is not applied. When the RST index is not zero, RST is applied, and the kernel is chosen based on the RST index.

In some embodiments, RST is applied for intra CU in both intra and inter slices, and for both luma and chroma. In an example, when a dual tree is enabled, RST indices for luma and chroma are signaled separately. For inter slice (the dual tree is disabled), a single RST index is signaled and used for both luma and chroma. When ISP mode is selected, RST is disabled, and RST index is not signaled.

In some embodiments, an RST matrix is chosen from four transform sets, and each set includes two transforms. The chosen of the transform set is determined based on intra prediction mode.

When one of three cross component linear model (CCLM) modes is indicated, transform set 0 is selected. Otherwise, transform set selection is performed according to a table.

FIG. 18 shows a table that is used for transform set selection in an example. In the FIG. 18 example, IntraPredMode has a range of [−14, 83] and is used for wide angle intra prediction. The corresponding transform mode index to the InPredMode is the transformed mode index used for wide angle intra prediction.

Using the RST design adopted in VVC Draft v5 as an example, the RST utilizes 4×2 16×16 transform matrices (RST4×4) and 4×2 16×48 transform matrices (RST8×8), and each element in the transform matrix is represented using 8-bit integers. Thus, a total of 4×2×(256+768)=8K bytes memory is used for storing the transform matrices.

According to some aspects of the disclosure, when a mode, such as CIIP mode and Inter PDPC mode, that combines intra prediction and inter prediction, the mode may have higher complexity than regular inter prediction. Some aspects of the disclosure provide techniques to limit the computational complexity of CIP mode and/or Inter PDPC mode.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit, i.e. CU.

The techniques associated with the CIP mode and the techniques associated with the inter PDPC mode are described separately.

In some embodiments, applications of certain coding tools depend on whether CIP mode is used. For example, when CIP mode is used for the current block, certain coding tools are disabled on the current block or certain coding tools are applied on the current block.

In an embodiment, when CIIP mode is used for a current block, weighted bi-prediction with unequal weighting can be disabled on the inter prediction part used by CIP on current block. In some examples, weighted bi-prediction with equal weighting is a default bi-prediction. To use CIIP on the current mode, the weighted bi-prediction with unequal weighting is disabled for the inter prediction part of the CIIP, the default bi-prediction that uses equal weighting can be used for the inter prediction part.

In another embodiment, when CIIP mode is used for a current block, the weighted bi-prediction with unequal weighting can be used for the inter prediction part of the CIIP. However, the weightings for combining intra prediction part and the inter prediction part of the CIIP depend on whether weighted bi-prediction with unequal weighting is used for the inter prediction part. For example, when weighted bi-prediction with unequal weighting is used for the inter prediction part, first set of weightings are used for combining intra prediction part and the inter prediction part of the CIIP; and when weighted bi-prediction with unequal weighting is not used for the inter prediction part, second set of weightings are used for combining intra prediction part and the inter prediction part of the CIIP. The first set of weightings is different from the second set of weightings.

In another embodiment, when CIIP mode is used for current block, weighted prediction is disabled on the inter prediction part of the CIIP on current block.

In another embodiment, when CIIP mode is used for current block, secondary transform or LFNST can be used for the coding of the current block. In an example, the transform set used for CIP mode is the same as the transform set for Planar or DC intra prediction mode. In another example, when CIIP mode is used for current block, secondary transform may be used and only the transform kernel associated with Planar and/or DC mode are applied. The limitations in the transform can reduce total complexity.

In another embodiment, when CIIP mode is used for current block, LIC is disabled on the inter prediction part used by CIIP on current block.

Similarly, applications of certain coding tools depend on whether inter PDPC mode is used. In some embodiments, when inter PDPC mode is used on the current block, certain coding tools are disabled on the current block. In other embodiments, when inter PDPC mode is used on the current block, certain coding tools can be applied on the current block.

In an embodiment, when inter PDPC mode is used for the current block, secondary transform may be used, and the transform set used for CIIP mode is the same as Planar or DC intra prediction mode. The limitations in the transform can reduce total complexity.

In another embodiment, when inter PDPC mode is used for the current block, DMVR may be disabled in the inter prediction part of the CIIP.

In another embodiment, when inter PDPC mode is used for the current block, BCW may be disabled or default equal weighting is used;

In another embodiment, when inter PDPC mode is used for the current block, weighted bi-prediction with unequal weighting may be disabled on the inter prediction used by Inter PDPC on current block.

In another embodiment, when inter PDPC mode is used for the current block, weighted prediction may be disabled on the inter prediction used by inter PDPC on current block.

In another embodiment, when inter PDPC is used for current block, LIC is disabled on the inter prediction part used by inter PDPC on current block.

According to an aspect of the disclosure, CIIP mode can be signaled using a CIIP flag, and inter PDPC mode can be signaled using an inter PDPC flag. In some embodiments, the CIIP flag and the inter PDPC flag can be coded using the same context model. In an example, a context using context adaptive binary arithmetic coding (CABAC) is used for coding both CIIP flag and inter PDPC flag. The context is then updated in response to codings of CIIP flags and inter PDPC flags.

Figure 19:
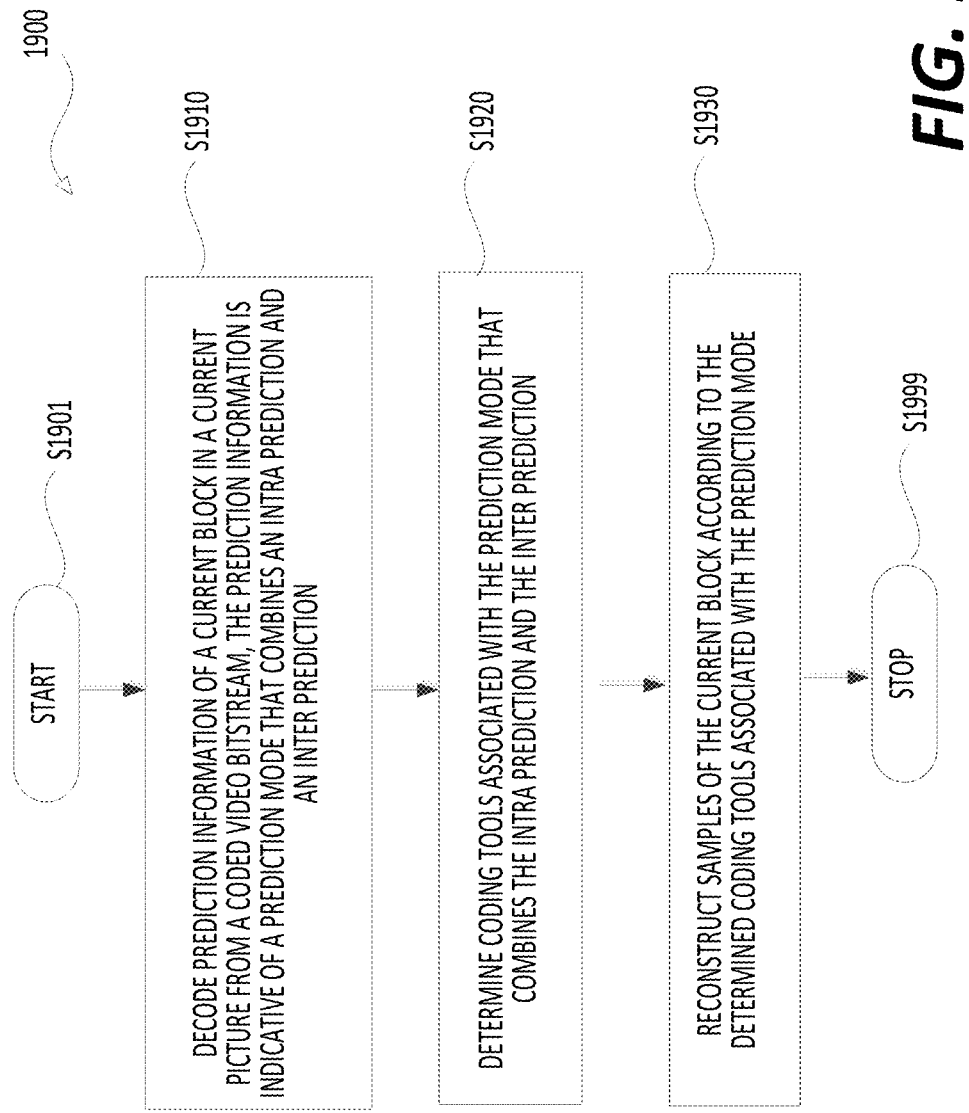
FIG. 19 shows a flow chart outlining a process example according to some embodiment of the disclosure.

FIG. 19 shows a flow chart outlining a process (1900) according to an embodiment of the disclosure. The process (1900) can be used in the reconstruction of a block, so to generate a prediction block for the block under reconstruction. In various embodiments, the process (1900) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1900) is implemented in software instructions, thus when the processing circuitry executes the software instructions, the processing circuitry performs the process (1900). The process starts at (S1901) and proceeds to (1910).

At (S1910), prediction information of a current block in a current picture from a coded video bitstream is decoded. The prediction information is indicative of a prediction mode that combines an intra prediction based on first reference samples in the current picture, and an inter prediction based on second reference samples in a reference picture of the current picture. In some embodiments, the prediction mode is one of the CIIP mode, and the inter PDPC mode. In an example, a CIP mode flag is decoded. In another example, an inter PDPC mode flag is decoded. In an embodiment, a same context is updated in response to any of the CIIP mode flag and the inter PDPC mode flag.

At (S1920), coding tools associated with the prediction mode that combines the intra prediction and the inter prediction are determined. In some embodiments, certain code tools are disabled for use with the prediction mode, and certain tools are selected for use with the prediction mode. In some embodiments, the selection and deselection of coding tools can reduce complexity for the prediction mode.

In an embodiment, a weighted prediction is disabled for use in the inter prediction.

In another embodiment, a weighed bi-prediction with unequal weighting is disabled for use in the inter prediction.

In another embodiment, a weighed bi-prediction with equal weighting can be performed in the inter prediction.

In another embodiment, a local illumination compensation (LIC) is disabled for use in the inter prediction.

In another embodiment, a secondary transform, such as RST, LFNST, and the like is performed between a de-quantization and a primary transform. In some examples, a transform set associated with one of a Planar intra prediction mode and a DC intra prediction mode is determined. Further, from the transform set, a transform kernel associated with one of the planar intra prediction mode and the DC intra prediction mode is selected for use in the secondary transform.

In an embodiment, when the prediction mode is the inter PDPC mode, DMVR is disabled for use in the inter prediction.

At (S1930), samples of the current block are reconstructed according to the determined coding tools associated with the prediction mode. Then, the process proceeds to (S1999) and terminates.

The techniques described above, can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
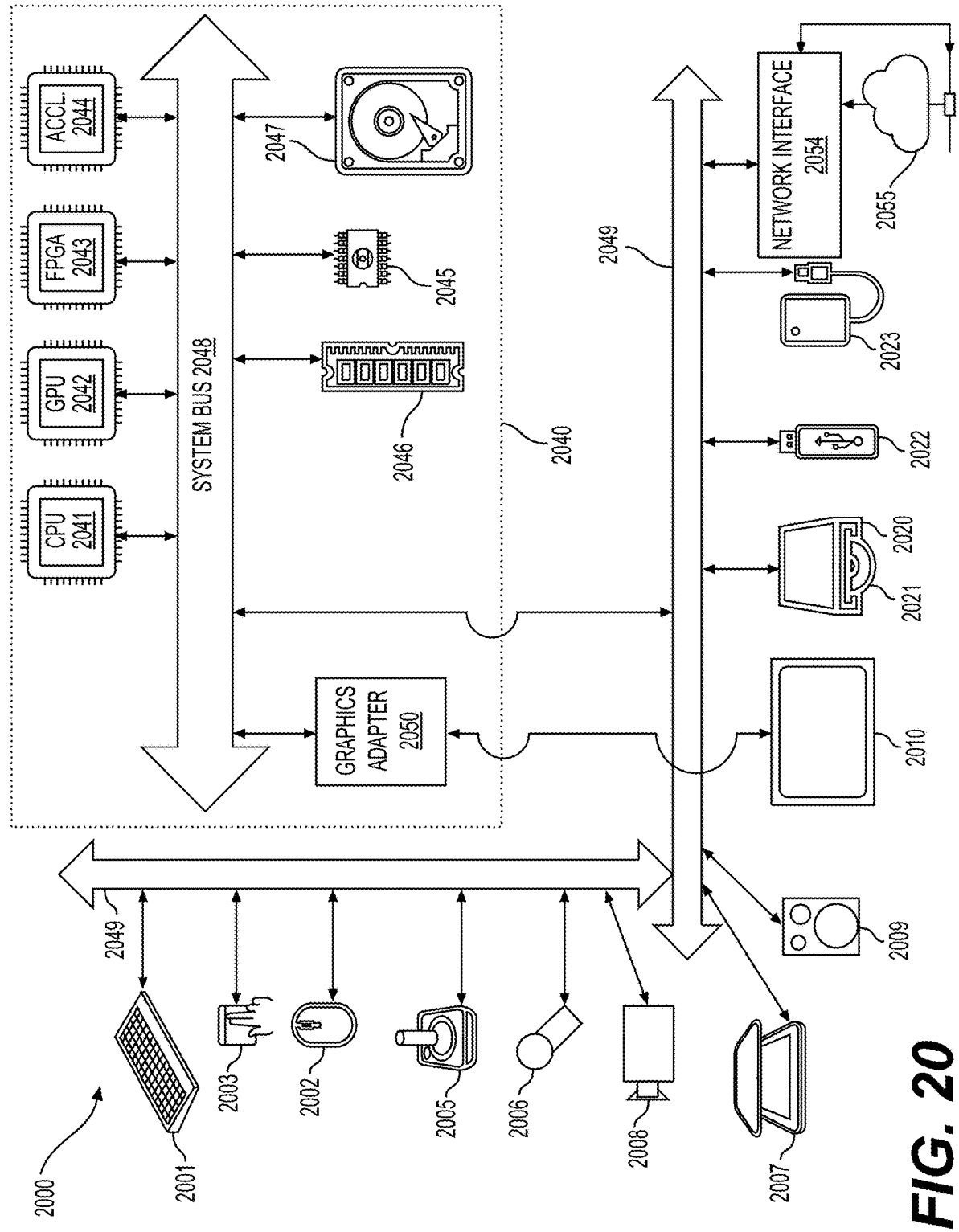
FIG. 20 is a schematic illustration of a computer system in accordance with an embodiment.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), and so forth. These devices, along with Read-only memory (ROM) (2045), Random-access memory (2046), internal mass storage such as internal non-user accessible hard drives, SSDs, and the like (2047), may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can be also be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SE: Supplementary Enhancement Information
VU: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
decoding, by a processor, prediction information of a current block in a current picture from a coded video bitstream, the prediction information being indicative of a prediction mode that combines an intra prediction and an inter prediction, the intra prediction being based on at least a first reference sample in the current picture, and the inter prediction being based on at least a second reference sample in a reference picture of the current picture;
determining, by the processor, coding tools associated with the prediction mode that combines the intra prediction and the inter prediction; and
reconstructing, by the processor, at least a sample of the current block according to the determined coding tools associated with the prediction mode, the reconstructing including, in response to the prediction mode being one of a combined intra/inter prediction (CIIP) mode and an inter position dependent prediction combination (PDPC) mode:
determining, by the processor, a transform set associated with at least one of a Planar intra prediction mode or a DC intra prediction mode;
selecting, by the processor, from the transform set, a transform kernel associated with the at least one of the Planar intra prediction mode or the DC intra prediction mode for use in a secondary transform; and
performing, by the processor, the secondary transform between a de-quantization and a primary transform.

2. The method of claim 1, wherein the prediction mode is one of the CIIP mode and the inter PDPC mode.

3. The method of claim 1, further comprising:
in response to the prediction mode being the one of the CIIP mode and the inter PDPC mode, disabling, by the processor, a weighed bi-prediction with unequal weighting for use in the inter prediction.

4. The method of claim 1, further comprising:
in response to the prediction mode being the one of the CIIP mode and the inter PDPC mode, disabling, by the processor, a local illumination compensation for use in the inter prediction.

5. The method of claim 1, further comprising:
in response to the prediction mode being the one of the CIIP mode and the inter PDPC mode, performing, by the processor, a weighed bi-prediction with equal weighting in the inter prediction.

6. The method of claim 1, further comprising:
updating, by the processor, a same context in response to a decoded CIIP mode flag, and in response to a decoded inter PDPC mode flag.

7. The method of claim 1, further comprising:
in response to the prediction mode being the inter PDPC mode, disabling, by the processor, decoder side motion vector refinement (DMVR) for use in the inter prediction.

8. The method of claim 1, further comprising:
in response to the prediction mode being the one of the CIIP mode and the inter PDPC mode, disabling, by the processor, a weighted prediction for use in the inter prediction for the prediction mode, the weighted prediction applying a weight on a prediction signal when the prediction signal is determined according to a uni-prediction.

9. An apparatus for video decoding, comprising:
processing circuitry configured to:
decode prediction information of a current block in a current picture from a coded video bitstream, the prediction information being indicative of a prediction mode that combines an intra prediction and an inter prediction, the intra prediction being based on at least a first reference sample in the current picture, and the inter prediction being based on at least a second reference sample in a reference picture of the current picture;
determine coding tools associated with the prediction mode that combines the intra prediction and the inter prediction; and
reconstruct at least a sample of the current block according to the determined coding tools associated with the prediction mode, by performing operations including, in response to the prediction mode being one of a combined intra/inter prediction (CIIP) mode and an inter position dependent prediction combination (PDPC) mode:
determination of a transform set associated with at least one of a Planar intra prediction mode or a DC intra prediction mode;
selection, from the transform set, of a transform kernel associated with the at least one of the Planar intra prediction mode or the DC intra prediction mode for use in a secondary transform; and
the secondary transform between a de-quantization and a primary transform.

10. The apparatus of claim 9, wherein the prediction mode is one of the CIIP mode and the inter PDPC mode.

11. The apparatus of claim 9, wherein the processing circuitry is further configured to:
in response to the prediction mode being the one of the CIIP mode and the inter PDPC mode, disable a weighed bi-prediction with unequal weighting for use in the inter prediction.

12. The apparatus of claim 9, wherein the processing circuitry is further configured to:
in response to the prediction mode being the one of the CIIP mode and the inter PDPC mode, disable a local illumination compensation for use in the inter prediction.

13. The apparatus of claim 9, wherein the processing circuitry is further configured to:
in response to the prediction mode being the one of the CIIP mode and the inter PDPC mode, perform a weighed bi-prediction with equal weighting in the inter prediction.

14. The apparatus of claim 9, wherein the processing circuitry is further configured to:
update a same context in response to a decoded CIIP mode flag, and in response to a decoded inter PDPC mode flag.

15. The apparatus of claim 9, wherein the processing circuitry is further configured to:
in response to the prediction mode being the inter PDPC mode, disable decoder side motion vector refinement (DMVR) for use in the inter prediction.

16. The apparatus of claim 9, wherein the processing circuitry is further configured to:
in response to the prediction mode being the one of the CIIP mode and the inter PDPC mode, disable a weighted prediction for use in the inter prediction for the prediction mode, the weighted prediction applying a weight on a prediction signal when the prediction signal is determined according to a uni-prediction.

17. A method for video decoding in a decoder, comprising:
- decoding, by a processor, prediction information of a current block in a current picture from a coded video bitstream, the prediction information being indicative of a prediction mode that combines an intra prediction and an inter prediction, the intra prediction being based on at least a first reference sample in the current picture, and the inter prediction being based on at least a second reference sample in a reference picture of the current picture;
- determining, by the processor, coding tools associated with the prediction mode that combines the intra prediction and the inter prediction;
- reconstructing, by the processor, at least a sample of the current block according to the determined coding tools associated with the prediction mode; and
- updating, by the processor, a same context in response to a decoded combined intra/inter prediction (CIIP) mode flag, and in response to a decoded inter position dependent prediction combination (PDPC) mode flag, when the prediction mode is one of the CIIP mode and the inter PDPC mode.

18. The method of claim 17, further comprises:
in response to the prediction mode being the inter PDPC mode, disabling, by the processor, decoder side motion vector refinement (DMVR) for use in the inter prediction.

* * * * *